United States Patent [19]
Favor et al.

[11] Patent Number: 5,754,812
[45] Date of Patent: May 19, 1998

[54] OUT-OF-ORDER LOAD/STORE EXECUTION CONTROL

[75] Inventors: John G. Favor, San Jose; Amos Ben-Meir, Cupertino; Warren G. Stapleton, San Jose; Jeffrey E. Trull, San Jose; Mark E. Roberts, San Jose, all of Calif.

[73] Assignee: Advanced Micro Devices, Inc., Sunnyvale, Calif.

[21] Appl. No.: 592,209

[22] Filed: Jan. 26, 1996

[51] Int. Cl.$^6$ .................................................. G06F 9/312
[52] U.S. Cl. ...................................... 395/392; 395/390
[58] Field of Search ............................... 395/392, 393, 395/394

[56] References Cited

U.S. PATENT DOCUMENTS

| | | | |
|---|---|---|---|
| H1291 | 2/1994 | Hinton et al. | 395/394 |
| Re. 34,052 | 9/1992 | Hester et al. | 395/393 |
| 4,180,861 | 12/1979 | Armstrong . | |
| 5,095,458 | 3/1992 | Lynch et al. . | |
| 5,404,470 | 4/1995 | Miyake | 395/392 |
| 5,450,560 | 9/1995 | Bridges et al. . | |
| 5,467,473 | 11/1995 | Kahle et al. . | |
| 5,640,588 | 6/1997 | Vegesna et al. | 395/392 |
| 5,664,137 | 9/1997 | Abramson et al. | 395/392 |
| 5,666,506 | 9/1997 | Hesson et al. | 395/392 |

FOREIGN PATENT DOCUMENTS

| | | |
|---|---|---|
| 0 305 639 | 3/1989 | European Pat. Off. . |
| 0 332 845 A2 | 9/1989 | European Pat. Off. . |
| 0 533 337 A1 | 3/1993 | European Pat. Off. . |
| 0679988 A1 | 11/1995 | European Pat. Off. . |
| 94 08287 | 4/1994 | WIPO . |

OTHER PUBLICATIONS

Anderson: "Multiple match resolvers: a new design method", 1 Dec. 1974, pp. 1317–1320, IEEE Transactions On Computers, vol. c23, No. 12., XP002021007.

Article entitled "AMD K6 Takes On Intel P6", Copyright Jan. 1996, BYTE, pp. 67–68, 70 & 72.

*Primary Examiner*—William M. Treat
*Attorney, Agent, or Firm*—Skjerven, Morrill, MacPherson, Franklin & Friel, L.L.P.; David W. O'Brien

[57] ABSTRACT

Scheduler logic which tracks the relative age of stores with respect to a particular load (and of loads with respect to a particular store) allows a load-store execution controller constructed in accordance with the present invention to hold younger stores until the completion of older loads (and to hold younger loads until completion of older stores). Address matching logic allows a load-store execution controller constructed in accordance with the present invention to avoid load-store (and store-load) dependencies. Propagate-kill scan chains supply the relative age indications of loads with respect to stores (and of stores with respect to loads).

83 Claims, 11 Drawing Sheets

OUT-OF-ORDER LOAD/STORE EXECUTION CONTROL

BACKGROUND OF THE INVENTION

1. Field of the Invention

This invention relates to processors, and in particular to out-of-order execution control in a processor having multiple execution units.

2. Description of the Related Art

General purpose computers execute programs which are typically represented in executable form as ordered sequences of machine instructions. Human-readable representations of a program are converted to sequences of machine instructions for a desired target architecture, e.g., to object code for a processor conforming to the x86 processor architecture, in a process known as compilation. Typically, computer programs are designed, coded, and compiled with a simplifying assumption that the resulting object code will be executed in sequential order. However, despite this assumption, modern processor design techniques seek to exploit opportunities for concurrent execution of machine instructions, i.e., instruction parallelism.

To maximize computational throughput, superscalar techniques can be used to map instruction parallelism to multiple execution units. In contrast, pipelining techniques involve the exploitation of instruction parallelism within stages of a single functional unit or execution path. Superscalar techniques, which are known in the art of superscalar processor design, include out-of-order instruction issue, out-of-order instruction completion, and speculative execution of instructions.

Out-of-order instruction issue involves the issuance of instructions to execution units with little regard for the actual order of instructions in executing code. A superscalar processor which exploits out-of-order issue need only be constrained by dependencies between the output (results) of a given instruction and the inputs (operands) of subsequent instructions in formulating its instruction dispatch sequence. Out-of-order completion, on the other hand, is a technique which allows a given instruction to complete (e.g. store its result) prior to the completion of an instruction which precedes it in the program sequence. Finally, speculative execution involves the execution of an instruction sequence based on predicted outcomes (e.g., of a branch). Speculative execution (i.e., execution under the assumption that branches are correctly predicted) allows a processor to execute instructions without waiting for branch conditions to actually be evaluated. Assuming that branches are predicted correctly more often than not, and assuming that a reasonable efficient method of undoing the results of an incorrect prediction is available, the instruction parallelism (i.e., the number of instructions available for parallel execution) will typically be increased by speculative execution (see Johnson, Superscalar Processor Design, Prentice-Hall, Inc., New Jersey, 1991, pp. 63–77 for an analysis).

Executing instructions out of sequential order, i.e., issuing and completing instructions out of sequential order, can increase a superscalar processor's performance by allowing the superscalar processor to keep multiple execution units operating in parallel and thereby improving throughput. Accordingly, a scheduler for a superscalar processor can improve overall performance by determining which instructions can be executed out-of-order and providing, or dispatching, those instructions to appropriate execution units. A scheduler for a superscalar processor must also handle interrupts and traps. Many processor architectures, including the x86 processor architecture, require that an architectural state be known just before or after an instruction generates an error, interrupt, or trap. This presents a difficulty when instructions are executed out of sequential order. Therefore, the scheduler must be able to undo instructions and reconstruct the system's state as if instructions executed in sequential order.

Architectural designs for exploiting the instruction parallelism associated with each of these techniques have been proposed in a variety of articles and texts. For a discussion, see Johnson, pp. 127–146 (out of order issue), pp. 103–126 (out-of-order completion and dependency), pp. 87–102 (branch misprediction recovery). Two architectural approaches for exploiting instruction parallelism are the reservation station and the reorder buffer. A reservation station is essentially an instruction and operand buffer for a given execution unit within a processor which includes multiple execution units; however, in addition to buffering instructions and operands, a reservation station provides a means for directly receiving results from other execution units. In this way, an instruction for which operands are not yet available can be dispatched to the reservation station for a given execution unit without waiting for its operands to be stored in and then retrieved from a register. Tomasulo, "An Efficient algorithm for Exploiting Multiple Execution Units," IBM Journal, vol. 11, January 1967, pp. 25–33, discloses a floating point processor implementation which includes multiple execution units, each with a reservation station.

A reorder buffer is a content-addressable store which maintains the speculative (i.e., out-of-order) state of registers in a processor which includes multiple execution units. When each instruction is decoded, a reorder-buffer entry is allocated to store the instruction's result and a temporary identifier, or tag, is created to identify the result. In a normal instruction sequence, a given register may be written many times and therefore multiple reorder buffer entries will be allocated, corresponding to the state of the register at different points in the instruction sequence. As instructions which require register values as operands are dispatched, the most recently allocated reorder buffer entry is referenced, or if no reorder buffer entry corresponds to the required register location, the value stored in the register file is used. Assuming that a corresponding reorder buffer entry has been allocated, the value of an operand required by a given instruction is supplied by the reorder buffer if the instruction which computes the operand value has completed; otherwise, a tag is supplied allowing the instruction to recognize the result when it becomes available. A superscalar processor design which incorporates a reorder buffer also provides facilities to retire reorder buffer entries (i.e., store the entry value to the register file or discard the entry if no longer needed).

A reorder buffer implementation facilitates various superscalar techniques including register renaming, branch misprediction exception handling, and out-of-order instruction completion. A superscalar architecture which includes reservation stations and a reorder buffer also facilitates the exploitation of instruction parallelism among execution units which receive operands from, and store their results to, a reorder buffer.

Superscalar techniques largely concern processor organization independent of instruction set and other architectural features. Thus, one of the attractions of superscalar techniques is the possibility of developing a processor that is code compatible with an existing architecture, for example the x86 processor architecture. Many superscalar techniques apply equally well to either RISC or CISC architectures. However, because of the regularity of many of the RISC architectures, superscalar techniques have initially been applied to RISC processor designs. In particular, the three operand load/store architecture, fixed instruction lengths, limited addressing modes, and fixed-width registers associated with a RISC architecture and instruction set facilitate the single cycle decoding of multiple instructions necessary to supply multiple execution units with work.

One approach to developing a superscalar processor that is code compatible with an x86 architecture has been to dynamically translate x86 instructions into RISC instructions, or operations, which may then be executed by a RISC core or execution engine. Techniques for designing such a superscalar RISC processor are described in Johnson, Superscalar Processor Design.

SUMMARY OF THE INVENTION

It has been discovered that loads and stores may generally be executed independently and out-of-order with respect to each other in a processor which provides an out-of-order load-store execution controller. Scheduler logic which tracks the relative age of stores with respect to a particular load (and of loads with respect to a particular store) allows a load-store execution controller constructed in accordance with the present invention to hold younger stores until the completion of older loads (and to hold younger loads until completion of older stores). Address matching logic allows a load-store execution controller constructed in accordance with the present invention to avoid load-store (and store-load) dependencies. In a processor having a load unit and a store unit, such a load/store execution controller allows load and store instructions to execute generally out-of-order with respect to each other while enforcing data dependencies between the load and store instructions.

In one embodiment of the present invention, a load/store execution controller includes an age ordered array of scheduler operation entries, load hold logic, and scan chain logic. Each scheduler operation entry is indicative of a corresponding operation in an operation sequence. The load hold logic is coupled to a load unit to selectively inhibit execution of a load operation in the load unit upon receipt of a store older indication. The scan chain logic is coupled to the operation entries and to the load hold logic. The scan chain logic supplies store older indications indicating the presence of a store operation which is older than a load operation in the load unit. In a further embodiment, the scheduler operation entries include operation type and operation state fields and the scan chain logic is coupled to receive the operand type and operand state fields. In yet a further embodiment, the store older indications include first and second store older indications. The first store older indication indicates the presence of an older store operation in a preliminary stage of store operation evaluation, whereas the second store older indication indicates the presence of an older store operation in a first execution stage of store operation evaluation. The scan chain logic differentiates between stages of store operation evaluation using the operation state fields. In yet a further embodiment, the store older indications also include a third store older indication indicating the presence of an older store operation in a second execution stage of store operation evaluation.

In still yet a further embodiment, the load hold logic includes first and second address match logic. The first address match logic is coupled to the store unit to receive a first store target address corresponding to a store operation in the first execution stage of store operation evaluation. The first address match logic matches the first store target address against the target address for the load operation. The second address match logic is coupled to the store unit to receive a second store target address corresponding to a store operation in the second execution stage of store operation evaluation. The second address match logic matches the second store target address against the target address for the load operation. In this way, the load hold logic inhibits execution of the load operation in response to the first store older indication. The load hold logic also inhibits execution of the load operation in response to the second store older indication when the first address match logic indicates a match between the first store target address and the target address for the load operation. The load hold logic also inhibits execution of the load operation in response to the third store older indication when the second address match logic indicates a match between the second store target address and the target address for the load operation.

In still yet a further embodiment, the scan chain logic includes first, second and third propagate-kill scan chains from older to younger scheduler operation entries. The first propagate-kill scan chain supplies the first store older indication when the state and type fields of the scheduler operation entries indicate a store operation in the preliminary stage of store operation evaluation which is older than the load operation in the load unit. The second propagate-kill scan chain supplies the second store older indication when the state and type fields of the scheduler operation entries indicate a store operation in the first execution stage of store operation evaluation which is older than the load operation in the load unit. The third propagate-kill scan chain supplies the third store older indication when the state and type fields of the scheduler operation entries indicate a store operation in the second execution stage of store operation evaluation which is older than the load operation in the load unit.

In still yet a further embodiment, the scan chain logic includes multiplexing logic and an AND-tree of operation entry level propagate signals. The AND-tree supplies a plurality of carry-in signals in response to the operation entry level propagate signals, which are functions of the operand type and operand state fields of the corresponding scheduler operation entry. The multiplexing logic is coupled to the AND-tree to receive the carry-in signals and is selective for a particular one of the carry-in signals corresponding to a scheduler operation entry associated with the load operation in the load unit.

In another embodiment of the present invention, a load/store execution controller includes an age ordered array of scheduler operation entries, store hold logic, and scan chain logic. Each scheduler operation entry is indicative of a corresponding operation in an operation sequence. The store hold logic is coupled to a store unit to selectively inhibit execution of a store operation in the store unit upon receipt of a load older indication. The scan chain logic is coupled to the operation entries and to the store hold logic. The scan chain logic supplies load older indications indicate the presence of a load operation which is older than a store operation in the store unit.

In another embodiment of the present invention for allowing load and store instructions to execute generally out-of-order with respect to each other while enforcing data dependencies between the load and store instructions, scan chain logic includes multiplexing logic and an AND-tree of propagate signals. The AND-tree supplies a plurality of carry-in signals in response to propagate signals. Such propagate signals are functions of operand type and operand state indications from corresponding entries in a scheduler array. The multiplexing logic is coupled to the AND-tree to receive the carry-in signals and is selective for a particular one of the carry-in signals corresponding to a load/store entry in the scheduler array.

In a further embodiment, the load/store entry is associated with a load operation and the propagate signals are indicative of the presence, in a corresponding entry of the scheduler array, of the load operation. The AND-tree supplies a plurality of group carry-in signals in response to the propagate signals and the group carry-in signals correspond to a group of entries in the scheduler array. The multiplexing logic includes group logic blocks and an OR-structure. The group logic blocks are each responsive to a first conjunction between the corresponding group carry-in signal and any of a plurality of selection signals indicating the presence of the load operation within the group of entries in the scheduler array. Each of the group logic blocks is also responsive to a second conjunction between a propagate signal and a corresponding selection signal. The OR-structure is coupled to each of the group logic blocks and supplies a store older indication indicating the presence, in the scheduler array, of at least one store operation older than the load operation.

In another further embodiment, the load/store entry is associated with a store operation and the propagate signals are indicative of the presense, in a corresponding entry of the scheduler array, of the store operation. The AND-tree supplies a plurality of group carry-in signals in response to the propagate signals and the group carry-in signals correspond to a group of entries in the scheduler array. The multiplexing logic includes group logic blocks and an OR-structure. The group logic blocks are each responsive to a first conjunction between the corresponding group carry-in signal and any of a plurality of selection signals indicating the presence of the store operation within the group of entries in the scheduler array. Each of the group logic blocks is also responsive to a second conjunction between a propagate signal and a corresponding selection signal. The OR-structure is coupled to each of the group logic blocks and supplies a load older indication indicating the presense, in the scheduler array, of at least one load operation older than the store operation.

BRIEF DESCRIPTION OF THE DRAWINGS

The present invention may be better understood, and its numerous objects, features, and advantages made apparent to those skilled in the art by referencing the accompanying drawings.

Use of the same reference symbols in different figures indicates similar or identical items.

DETAILED DESCRIPTION OF THE PREFERRED EMBODIMENTS

Figure 1:
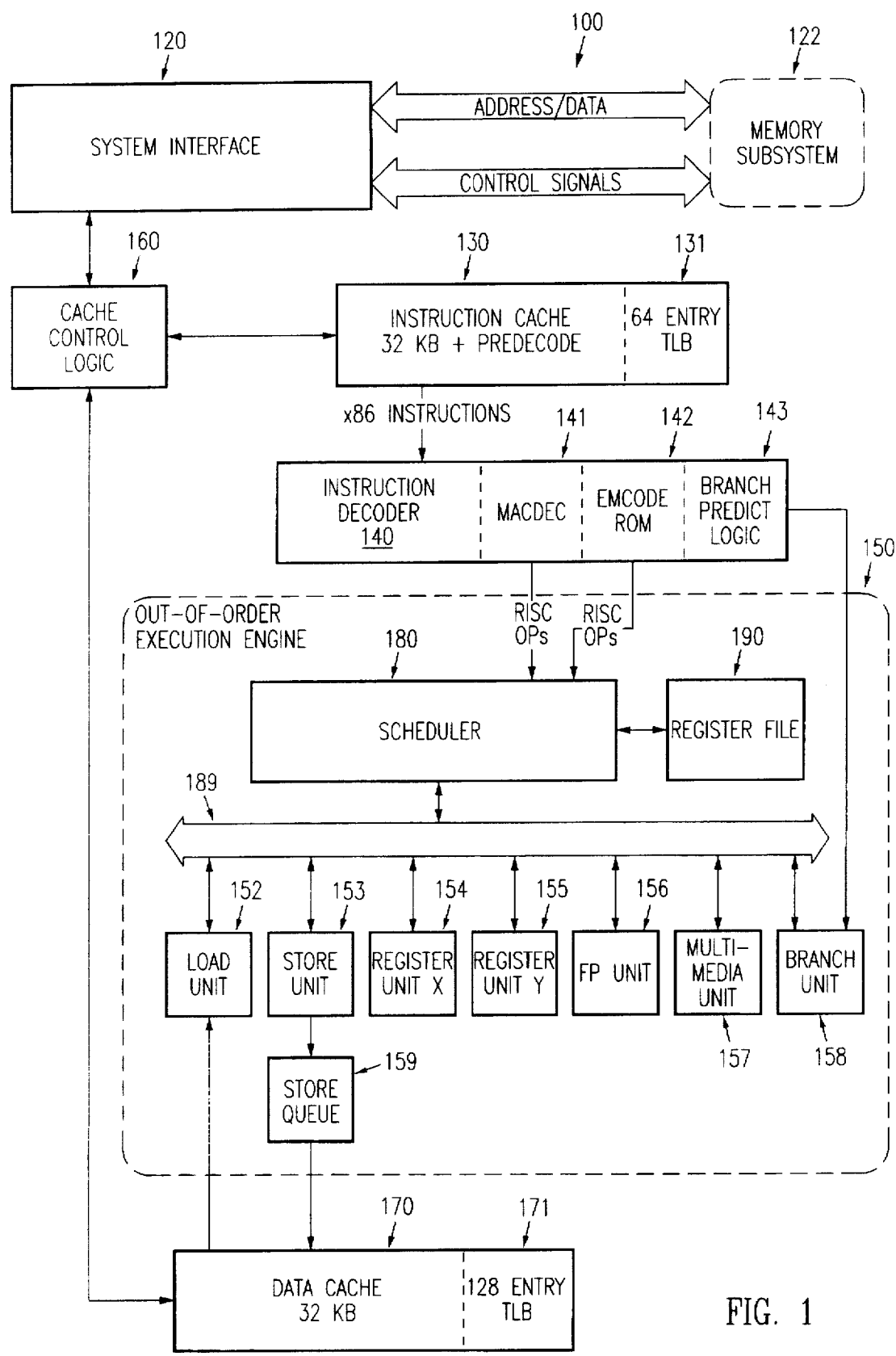
FIG. 1 is a block diagram of a superscalar computer processor providing out-of-order execution control in accordance with an embodiment of the present invention.

FIG. 1 depicts a superscalar processor embodiment of the present invention. Superscalar processor 100 includes an execution engine 150 which implements a reduced instruction set computing (RISC) architecture, an instruction decoder 140, caches, and a system interface 120 providing access to an address space represented in memory subsystem 122 and to devices on local busses (not shown).

Superscalar processor 100 includes a cache which, in the embodiment described herein, is organized as separate data and instruction portions. Data cache 170 and instruction cache 130 are coupled (through cache control logic 160 and via system interface 120) to the address space represented in memory subsystem 122 which includes main memory and optionally includes additional levels of cache, illustratively an L2 cache. Access to an L2 level cache, i.e., to L2 cache control logic and an L2 data portion (not shown), may be provided via system interface 120. Alternatively, L2 cache control logic may be interposed between cache control logic 160 (for L1) and system interface 120.

Cache system designs are well known in the art. In particular, suitable designs implementing split, "Harvard Architecture" instruction and data caches (such as 170 and 130) and multi-level cache hierarchies are well known in the cache arts. In most respects, the cache subsystem of superscalar processor 100 (i.e., data cache 170, instruction cache 130, cache control logic 160, and an optional L2 cache) is of any such suitable design. However, for reasons apart from its caching performance, instruction cache 130 is integrated with pre-decode logic (not shown). Such integrated pre-decode logic identifies x86 instruction boundaries in the fetched instruction stream and facilitates the rapid decoding of instructions by instruction decoder 140. Integration of pre-decode logic with instruction cache 130 is described in greater detail in a co-pending patent application entitled, "Instruction Predecode and Multiple Instruction Decode," U.S. patent application Ser. No. 08/592,207 filed on Jan. 26, 1996, naming Favor et al. as inventors and filed on even date herewith, the detailed description of which is hereby incorporated by reference.

Referring again to FIG. 1, instruction sequences are loaded from the memory subsystem into instruction cache 130 for anticipated execution by execution engine 150. In accordance with the embodiment of processor 100 shown in FIG. 1, instructions in instruction cache 130 are CISC instructions selected from a complex instruction set such as the x86 instruction set implemented by processors conforming to the x86 processor architecture. Instruction decoder 140 converts CISC instructions received from instruction cache 130 to operations for execution engine 150. In the embodiment of FIG. 1, these operations are RISC-like operations (hereafter Ops) and a single x86 instruction from instruction cache 130 decodes into one or more Ops for execution engine 150. Individual Ops fall into one of several type groups including register operations (RegOps), load-store operations (LdStOps), load immediate value operations (LIMMOps), special operations (SpecOps), and floating point operations (FpOps). Alternative embodiments may decode different instruction sets and supply different operation types for execution.

Instruction decoder 140 includes two instruction translation portions, a hardware translation portion MacDec 141 and a ROM-based translation portion 142, together with branch prediction logic 143. Most common x86 instructions are translated into short sequences of 1 to 4 Ops using multiple parallel hardware decoders included in hardware translation portion 141. Hardware translation portion 141 decodes these common x86 instructions received from instruction cache 130 into short sequences of Ops which are then supplied to scheduler 180. Less common x86 instructions and those x86 instructions which translate into Op sequences longer than 4 Ops are translated by a ROM-based translation portion 142 which fetches (from ROM) a translated sequence of Ops corresponding to the particular x86 instruction to be translated. Translated Op sequences from either source, whether generated by hardware decoders or fetched from ROM, are supplied to scheduler 180 for execution by execution engine 150. The design and operation of instruction decoder 140 and the mapping of x86 instructions to RISC OPs are described in greater detail in a co-pending patent application entitled, "Instruction Predecode and Multiple Instruction Decode," U.S. patent application Ser. No. 08/592,207 filed on Jan. 26, 1996, naming Favor et al. as inventors, the detailed description of which is hereby incorporated by reference.

Referring again to FIG. 1, execution engine 150 includes a scheduler 180, a register file 190, and multiple execution units which receive and execute Ops dispatched by scheduler 180. In the embodiment of FIG. 1, execution engine 150 includes seven execution units: load unit 152, store unit 153, register units 154 and 155, floating point unit 156, multimedia unit 157, and a branch unit 158, although alternative embodiments may add to or subtract from the set of execution units. In an exemplary embodiment, floating point unit 156 and multimedia unit 157 are omitted. Execution engine 150 also includes a store queue 159 interposed between store unit 153 and data cache 170.

Scheduler 180 is organized as an ordered array of storage entries and logic blocks coupled thereto, which together provide support for out-of-order dispatch of Ops to execution units and for forwarding of Op results to one or more execution units. The ordered array of storage entries and logic blocks also implements a reorder buffer and provides for renaming of the architectural registers defined in register file 190 and speculative execution recovery. Instruction decoder 140 supplies scheduler 180 with new Ops decoded from the instruction stream. In turn, scheduler 180 stores and maintains (in a storage entry) data associated with each new Op received. In this way scheduler 180 tracks the status of each Op and its associated data as the Op is issued to, and executed by, an execution unit. After a given Op is fully executed and data dependencies have been resolved, it is retired and the corresponding scheduler entry is released.

Scheduler 180 is coupled to execution units (i.e., load unit 152, store unit 153, register units 154 and 155, floating point unit 156, multimedia unit 157, and branch unit 158) via a group of busses and control lines collectively shown as a bus 189. Scheduler 180 supplies Ops, register operands, and control signals to the execution units and receives result values and status indications back from the execution units, illustratively via bus 189. Of course, all busses and control lines need not be fully connected and bus 189 is merely illustrative of the bidirectional coupling of scheduler 180 with the execution units.

Load unit 152 and store unit 153 execute LdStOps, respectively loading data from and storing data to addressable memory. Depending on the caching state of a particular memory address, a LdStOp may complete at the L1 data cache 170, at an L2 cache (not shown), or at main memory (also not shown). Store queue 159 temporarily stores data from store unit 153 so that store unit 153 and load unit 152 can operate in parallel without conflicting accesses to data cache 170. Register units 154 and 155 execute RegOps which operate on a data associated with the architectural registers of register file 190.

Scheduler Overview

Figure 2:
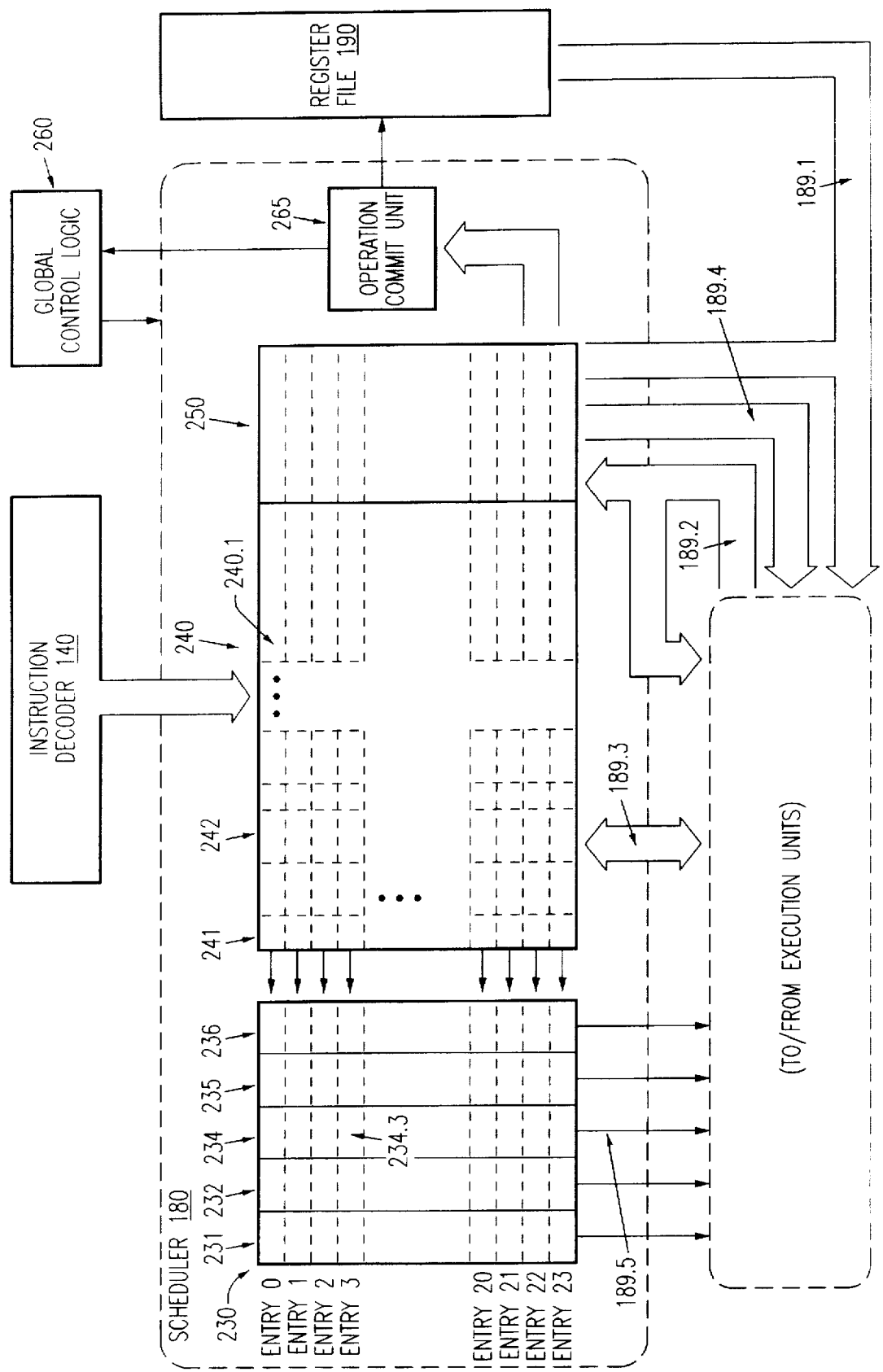
FIG. 2 is a block diagram of a scheduler constructed in accordance with an embodiment of the present invention.

FIG. 2 depicts an exemplary embodiment of scheduler 180 having 24 entries (shown as rows) wherein each entry is associated with a pending Op. Each entry includes a series of fields, collectively shown as scheduling reservoir 240, for representing static and dynamic data associated with a pending Op. In addition, scheduler 180 provides a series of specialized logic blocks, collectively shown as control logic 230, coupled to the entries of scheduling reservoir 240 to receive data associated with pending Ops. The specialized logic blocks (shown as columns 231, 232, 233, 235, and 236) of control logic 230 supply signals which control the sequencing of Op execution and the supply of operands to and distribution of results from the execution units. Control logic 230 includes issue selection logic 231, operand selection logic 232, load-store ordering logic 234, status flag handling logic 235, and self-modifying code support logic 536.

Issue selection logic 231 controls the selection of Ops from scheduling reservoir 240 for issue to available execution units during each cycle. Operand selection logic 232 identifies an appropriate source for operand data required by Ops which have been issued to execution units. Depending on data dependencies and sequencing of Ops within the execution engine 150, the appropriate source may be register file 190, a destination value field associated with another pending Op entry (destination value fields for scheduler entries are shown collectively as 250), or the result of a completed Op which is supplied on one of the result buses (shown collectively as result busses 272). Control signals supplied by issue selection logic 231 and operand selection logic 232 allow scheduler 180 to issue Ops from scheduling reservoir 240 to available execution units and to select the appropriate operand source for each Op issued.

Scheduler 180 includes a destination value field associated with each scheduler entry. Collectively these destination value fields are shown as 250. In conjunction with operand selection logic 232, destination value fields 250 implement a reorder buffer and implicit register renaming. Operand values associated with architectural registers of register file 190 are represented in destination value fields 250 and are typically supplied to execution units as register operand values via operand busses 271. However, operand values may instead be supplied from register file 190 if none of the destination value fields 250 represent a more recent register state (i.e., an as yet uncommitted register state). Results of completed Ops are supplied via result busses 272 to the destination value field of the scheduler entry associated with the completed Op. In addition, the these results may also be supplied to execution units as operands for pending Ops. Results are forwarded via result busses 272. The design and operation of scheduler 180, including static and dynamic field definitions, are described in greater detail in a co-pending patent application entitled "Out-of-Order Execution Engine for Microprocessor" U.S. patent application Ser. No. 08/558,113 filed on Nov. 13, 1995, now abandoned, naming Favor et al. as inventors, the detailed description of which is hereby incorporated by reference.

The fields of a scheduling reservoir entry (illustratively, scheduling reservoir entry 240.1) contain information regarding an operation (Op) which is awaiting execution, which is in the process of being executed, or which is completed. Most of the fields of a scheduling reservoir entry are initialized when instruction decoder 130 loads a new Op into scheduling reservoir 240. However, other fields are later loaded or updated. For example, a state field (shown for each entry as field 242) is updated as the corresponding Op advances through stages of an execution pipeline. Storage fields that retain a value from the time an Op is loaded into scheduling reservoir 240 until retired from scheduler 180 are referred to as "static fields." Fields which can be updated with new values are referred to as "dynamic fields." A set of field definitions is provided in a co-pending patent application entitled "Out-of-Order Execution Engine for Microprocessor" U.S. patent application Ser. No. 08/558,113 filed on Nov. 13, 1995, now abandoned, naming Favor et al. as inventors, the detailed description of which is hereby incorporated by reference. However, in the context of load/store execution control, two fields, the type field 241 and the state field 242, bear further discussion.

A 3-bit field, Type[2:0], of each scheduling reservoir entry (shown in FIG. 2 as type field 241) specifies the Op type associated with the scheduling reservoir entry. Op type is particularly important for issue selection purposes (e.g., LdOps should issue to a load unit such as 150); however, load/store ordering control also makes use of type field 241. The following signals are decoded from type field 241:

| | |
|---|---|
| 000 = | A Special operation not actually executed. |
| 010 = LU | A LdOp executed by load unit 152. |
| 10x = SU | A StOp executed by store unit 153. |
| 101 = ST | A StOp which references memory or at least generates a faultable address (i.e. not an LEA operation). |
| 11x = RU | A RegOp executed by register unit X 154 or possibly register unit Y 155. |
| 110 = RUX | A RegOp executable ONLY by register unit X 154. |
| 111 = RUY | A RegOp executable by register unit X 154 or register unit Y 155. |

A 4-bit field, State[3:0], of each scheduling reservoir entry (shown in FIG. 2 as type state 242) indicates the current execution state of an Op (S3, S2, S1, and so are alternate signal names for State[3:0].) Five possible states of type field 242 are encoded by a shifting field of ones as follows:

0000 Unissued
0001 Stage 0
0011 Stage 1
0111 Stage 2
1111 Completed

Intermediate states correspond to the current execution stage for an Op corresponding to the entry in which the type field appears. The bits are updated (effectively by left shifting) as the Op is successfully issued or advances out of a stage. State[3:0] is also set to 1111 during abort cycles.

Scheduler Op Quad Organization

Scheduler 180 includes 24 entries in scheduling reservoir 240 and destination value fields 250 which are managed as a FIFO. Data corresponding to new Ops are loaded in at the "top," shift toward the "bottom" as execution "progresses," and are retired from the bottom of storage reservoir 240. To simplify control, scheduler 180 manages scheduling reservoir 240 and destination value fields 250 on an Op quad basis. Ops are loaded into, shifted through, and retired from scheduling reservoir 240 in groups of four. In this way, scheduler granularity matches the decode bandwidth of both the emcode ROM 142 and MacDec 141 of instruction decoder 140. Scheduler 180 therefore manages 24 Op entries as six Op quad entries in a six-deep, four-wide FIFO.

Despite the Op quad organization of scheduler 180, which is described in greater detail in a co-pending patent application entitled "Out-of-Order Execution Engine for Microprocessor" U.S. patent application Ser. No. 08/558,113 filed on Nov. 13, 1995, naming Favor et al. as inventors, the detailed description of which is hereby incorporated by reference, many aspects of scheduler operation are best understood by viewing the scheduling reservoir 240, destination value fields 250, and control logic 230 in the context of 24 entry granularity. For illustrative purposes, the discussion which follows is made in terms of a 24-entry scheduler 180, although those skilled in the art will recognize the advantages of Op quad granularity presented in the above-referenced co-pending application.

Operation (Op) Timing and Execution Stages

Each entry of scheduling reservoir 240 includes fields describing outstanding Ops. These fields store static information originally derived from the Ops fetched or decoded by instruction decoder 140 and also dynamic state information resulting from Op execution or characterizing the execution pipeline status of a given Op.

From a processor control perspective, scheduler 180 is an instruction sequence-ordered array of Op state information (scheduling reservoir 240) with associated control logic 230 generating control signals to issuing Ops from the array to respective execution units, to control Op execution through sequences of pipeline stages, and to eventually retiring Ops from the scheduler. As shown in FIG. 2, control logic 230 includes five specialized blocks of control logic (issue selection logic 231, operand selection logic 232, load-store ordering logic 234, status flag handling logic 235, and self-modifying code support logic 236), each having portions (illustratively portion 234.3 of load-store ordering logic 234) receiving information from corresponding entries of scheduling reservoir 240. Control logic blocks supply control signals to the execution units. For example, load-store ordering logic 234 supplies control signals to load unit 152 and store unit 153 via control lines represented collectively as 273.

The particular control signals supplied by control logic blocks of scheduling reservoir 240 depend on the state of fields in Op entries. In particular, the State[3:0] field indicates the progress of execution of associated operations. From a logical perspective, all state sequencing within the scheduler is single cycle in nature. State transition decisions are made each cycle based on the machine state during the cycle. The structure of scheduler 180 reflects the pipelined nature of Op execution. Scheduler 180 (and correspondingly each entry) can be divided into many distinct, rather independent logic portions, each of which is directly associated with a specific processing stage of a given type of operation or execution pipeline.

Figure 3:
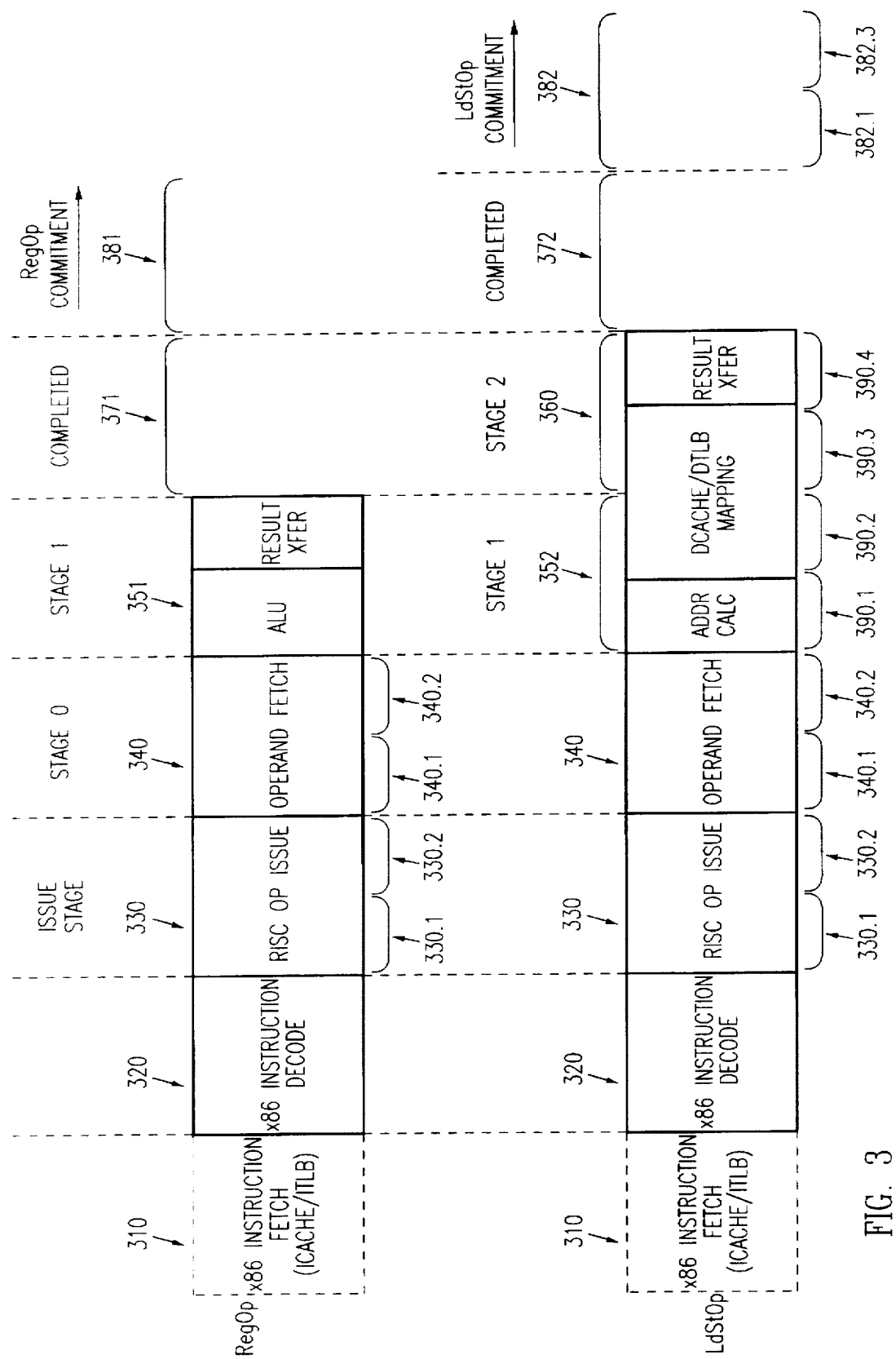
FIG. 3 is a pipeline staging diagram illustrating architectural stages in the execution of instructions in accordance with an embodiment of the present invention.

Pipeline staging of execution engine 150 is now described with reference to FIG. 3. Once an Op is loaded into execution engine 150, the Op goes through a three or four stage pipeline, and correspondingly transitions between four or five states represented by the field State[3:0] within the scheduler entry associated with the Op. Instruction fetch and decode are performed before execution engine 150, therefore the first scheduler-related pipeline stage is the issue stage. FIG. 3 shows pipeline staging for RegOps and LdStOps. Handling for other Ops, including BrOps, is described in a co-pending patent application entitled "Out-of-Order Execution Engine for Microprocessor" U.S. patent application Ser. No. 08/558,113 filed on Nov. 13, 1995, naming Favor et al. as inventors, the detailed description of which is hereby incorporated by reference.

Scheduler 180 exerts primary control over execution pipelines during the issue and operand fetch stages, 330 and 340. Processing within issue stage 330 and within operand fetch stage 340 can be broken down into two phases per stage, wherein each phase nominally occupying a half clock cycle. Issue stage 330 includes an issue selection phase and a broadcast phase, while operand fetch stage 340 includes an operand selection phase and operand forwarding phase.

Issue Stage

During the issue selection phase 330.1 of issue stage 330, scheduler 180 selects the next Ops to enter the pipelines associated with load unit 152, store unit 153, register unit X 154, and register unit Y 155 (four Op selections occur at once).

During the broadcast phase 330.2 of issue stage 330, information about each of the register operands for each selected Op is broadcast to all scheduler entries and to external logic (including register file 190 and the execution units). In this way, the broadcast phase 330.2 sets up to locate operand values which may reside in one of the destination value fields 250 of scheduler 180 or in register file 190, or which may correspond to results to be produced on result busses 272 one of the execution units (e.g., load unit 152, store unit 153, or register units 154 and 155).

Operand Fetch Stage

During the operand selection phase 340.1 of operand fetch stage 340, scheduler 180 locates up to eight operand values (4 Ops * 2 operands/Op) and determines the status of each operand value, i.e., whether a valid value is in fact available from the designated source. Based on this information, scheduler 180 determines which of the Ops in operand fetch stage 0 (stage 340) will advance into their respective execution pipes, i.e., into stage 1 (stage 350), following the operand forward phase. Advancement decisions are made independently for each Op and only operand dependencies need constrain the order with which operations are actually executed. Absent such data dependencies, Ops which issue to different execution units are generally processed through their respective pipelines in arbitrary order with respect to those Ops assigned to other execution units. One exception to this general rule involves the respective ordering of loads and stores (i.e., of LdOps and StOps) and is in greater detail discussed below.

LdStOp Execution Stages

The first two scheduler-related stages, the "operand issue" stage 330 and the "operand fetch" stage 340 are common to RegOps and LdStOps. Subsequent stages are the execution stages. RegOps include a single execution stage 350 because all RegOps execute in a single cycle. Furthermore, once a RegOp enters the execution stage, it always successfully completes and exits stage 350 at the end of that clock cycle. LdStOps, on the other hand, have two execution stages 352 and 360, during which address calculation, segment and page translation (and protection checking), and data cache accessing (in the case of LdOps) all take place. Unlike RegOps, LdStOps can be held up for arbitrary periods of time in either stage 360 or 370. Most hold ups appear in the second stage 370. Most commonly, hold ups in stage 370 result from data cache 170 misses, data TLB 171 misses, and page faults. Hold ups in stage 360 result from misaligned memory references and from stage 370 being occupied and blocked by an LdStOp not advancing to completion.

During the operand forward phase 340.2 of operand fetch stage 340, scheduler 180 transfers operand values from the designated sources via operand busses and/or result busses shown collectively in FIG. 2 as busses 271 and 272 to execution units such as load unit 152, store unit 153, register unit X 154, and register unit Y 155. The exemplary embodiment includes nine operand busses 271, eight of which provide operand values for operations in stage 0. Also in the exemplary embodiment, operand transfers occur regardless of whether values are valid, thereby simplifying control logic. If an operand value is invalid, it is ignored by the respective execution unit because the scheduler 180 does not advance the associated operation to stage 1. Immediate values for RegOps are handled as part of the register operand forwarding mechanism described above. In such cases, the immediate value is forwarded directly from the particular one of the destination value fields 250 of the scheduler 180 entries associated with the Op.

Displacement values are also transferred during operand forward phase 340.2, via displacement busses 189.4, to load unit 152 and store unit 153 (independent values to each unit). These displacements are 32-bit values and always come from the entries of scheduler 180. The selection of the source entry occurs during operand selection phase 340.1. When a LdOp or a StOp enters stage 1, load unit 152 and store unit 153 latch associated displacement and operand values.

Scheduler 180 implements the four-phase control mechanism (as described above) for providing the address operands and displacement; however, StOps require a store data operand in addition to address operands and displacement values. Scheduler 180 performs a four-phase process for obtaining the store data for a StOp. The StOp data obtaining process is similar to that described above; however the store data is obtained during execution stage 2 (370) of the store pipeline. The process for providing the store data is synchronized with stages 1 and 2 of the StOp and includes a selection phase 390.1 identifying the StOp in execution stage 1, a broadcast phase 390.2 transmitting information describing the source of a data operand, a data operand selection phase 390.3, and an data operand forwarding phase 390.4. In essence, store data is fetched in parallel with StOp execution; and the actual data value is obtained and provided to store queue 159 upon completion of StOp processing. If a valid store data value is not available, the StOp is held up in stage 2.

Load-Store Ordering Constraints

Just as a certain degree of execution ordering must be maintained between Ops which exhibit true data dependencies (as contrasted with mere contention for an architectural register which is avoided by scheduler 180 using register renaming), execution ordering must also be maintained between LdOps and StOps which read from (and write to) the same memory location.

In general, loads and stores may execute out-of-order with respect to each other; however, if a younger load and older store access the same memory location, the older store should supply the data for the younger load (i.e., the younger load should wait for the older store). In such a case, the store data is provided to the younger load via data cache 170. Similarly, an older load must complete before a younger store is allowed to write to the same memory location. In such a case, the older store must wait. A combination of control logic in scheduler 180 and in load and store units 152 and 153 enforces such load-store ordering constraints.

Load-Store Ordering Control

Figure 4:
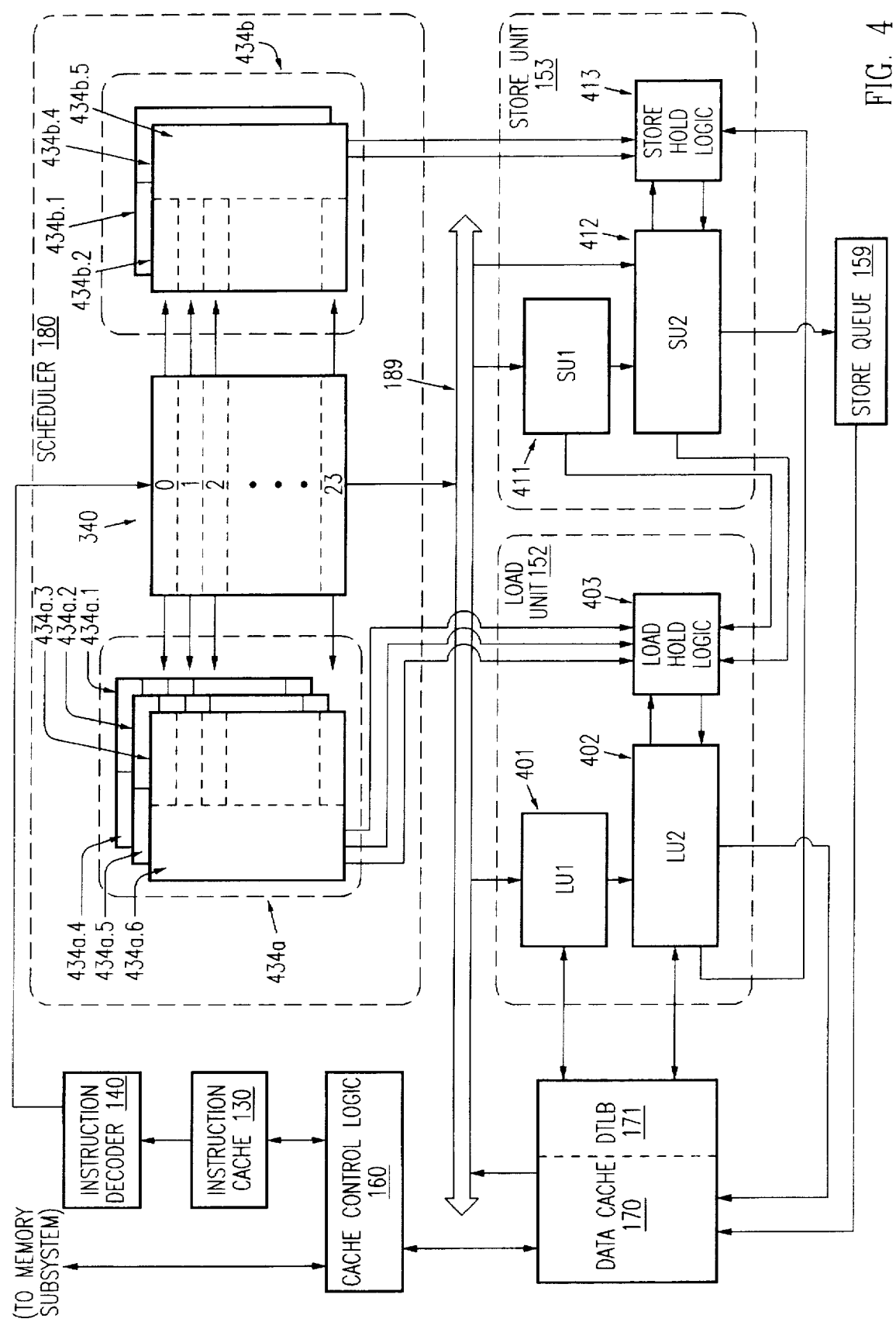
FIG. 4 is a block diagram of out-of-order load and store execution control components in accordance with an embodiment of the present invention.

In addition to the scheduler logic associated with operation issue and operand fetch, entries of scheduler 180 include load-store ordering logic 234 for providing out-of-order load-store execution control. Two portions of load-store ordering logic 234, which are respectively associated with load unit 152 and store unit 153, are shown in FIG. 4 as load ordering logic 434a and store ordering logic 434b. Together with load hold logic 403 and store hold logic 413 in the respective execution units, load-store ordering logic 234 enforces load-store execution ordering constraints.

Load Hold Logic

Focusing illustratively on load unit 152, load hold logic 403 checks for StOps in various pipe stages that are older than the LdOp in stage 2 (LU2 402) of load unit 152. In particular, load hold logic 403 checks for older StOps in stage 0, stage 1 (SU1 411), and stage 2 (SU2 412), i.e., stages 340, 352, and 360 of FIG. 3. Three signals (SC_SU2OLDER, SC_SU1OLDER, and SC_SU0OLDER), which are supplied to load hold logic 403 by load ordering logic 434a, signal an older StOp in stages 2, 1, and 0, respectively. More precisely, SC_SU0OLDER indicates the presence of an older StOp in stages of processing earlier than execution stages 1 and 2 (e.g., operand fetch stage 0 340 or issue stage 330). Load hold logic 403 also receives a partial memory addresses for the LdOp in stage 2 (LU2 402) of load unit 152 and selectively provides a hold signal (LU2_Hold) to LU2 402 under conditions now described.

An older StOp in stage 0 (or in an earlier stage) causes load hold logic 403 to unconditionally hold the current LdOp in stage 2 of load unit 152. On the other hand, an older StOp in stage 2 or stage 1, holds the current LdOp only if there is also a match between the memory addresses for the LdOp in stage 2 and older StOp. The following RTL describes the design and operation of load hold logic 403:

```
// LU2 Hold Logic;
// **************;
// LU2 Partial Address Match with SU pipe stage 2;
AddrMatch2 =
 (LinAddr(9,3) == SU2_PageOffset(9,3)) && (ByteMark &
     SU2_ByteMark) &&
 ! (LU2_SpecMem ^ SU2_SpecMem) && SU2_StV;
// LU2 Partial Address Match with SU pipe stage 1;
AddrMatch1 =
 (LinAddr (9,3) == SU1_LinAddr(9,3)) && (ByteMark &
     SU1_ByteMark) &&
 ! (LU2_SpecMem ^ SU1_SpecMem) && SU1_StV;
//Hold (LU2 needs to Hold);
// Note that Store Validity is taken into account in the
     SUnOlder
// signals;
LU2_Hold =
 SC_SU2Older && (AddrMatch2 || SMO) ||
 SC_SU1Older && (AddrMatch1 || SU1_FirstAddr || SMO) ||
 DTB_InhSptivLd && !SC_LdOldest || SC_SU0Older ||
 BusLocked && !Lock || LUViol;
```

Load hold logic 403 supplies the LU2_Hold signal to LU2 402 to inhibit execution of a stage 2 LdOp when any of the above-specified combinations of partial address matches (AddrMatch1 or AddrMatch2) and relative age indications (SC_SU2OLDER, SC_SU1OLDER, and SC_SU0OLDER) from scheduler 180 are present. Since no linear address has yet been computed for a StOp in stage 0, a younger LdOp in stage 2 is unconditionally held up for an older stage 0 StOp. As the older StOp advances to stages 1 and 2, a partial address mismatch may establish that no ordering constraints are violated by out-of-order completion of the younger LdOp and older StOp and load hold logic 403 will release the hold in accordance with the LU2_Hold equation.

In the exemplary embodiment described herein, a partial address match is performed based on a lower portion of the linear addresses for the potentially matching LdOp and StOp. The partial match is designed to select a large enough set of bits to limit the number of false matches, while balancing the speed and critical path impact of address match circuitry. In the exemplary embodiment, the partial linear address match is based on the lower bits of respective linear addresses (i.e., LinAddr(9,3), SU2_PageOffset(9,3), and SU1_LinAddr(9,3)) and balances an acceptable level of false matches with a desired match speed, although alternative embodiments may match larger or smaller numbers of address bits and may perform matches based on virtual, logical, linear, or physical addresses.

Eight-bit byte marks (ByteMark, SU1_ByteMark, and SU2_ByteMark) are also included in the partial address match. These byte marks are expanded variants of corresponding address bits 0, 1 and 2 which identify the particular bytes upon which a given LdOp or StOp operates, since in the exemplary embodiment (a processor implementation conforming to the x86 processor architecture), 1-byte, 2-byte, 4-byte, and 8-byte loads and stores are all supported. In the exemplary embodiment, these byte marks are compared to identify overlap, and therefore dependencies, between the particular bytes from which a LdOp reads and to which a StOp writes.

Several additional terms are included in the RTL describing load hold logic 403. For example, load hold logic 403 also inhibits the execution of non-speculative LdOps, i.e., those LdOps not allowed to read around a older memory transaction, as indicated by DTB_InhSptivLd. Non-speculative LdOps maintain strict ordering with respect to all older LdStOps, not just older StOps. For non-speculative loads, load hold logic 403 ensures that no older memory transactions are pending. Since scheduler 180 issues loads in order with respect to each other, that amounts to ensuring that there are no older StOps that have yet to be committed to data cache 170. Scheduler 180 tracks the status of StOps through store queue 159 to data cache 170 and supplies an SC_LdOldest signal indicating that no older uncommitted StOps exist.

Referring to FIG. 4, load hold logic 403 receives indications of the relative age of the LdOp in LU2 402 of load unit 152 from load ordering logic 434a. In particular, load hold logic 403 receives an SC_SU2OLDER indication, an SC_SU1OLDER indication, and an SC_SU0OLDER indication from respective scan chains (SU2 older scan chain 434a.1, SU1 older scan chain 434a.2, and SU0 older scan chain 434a.3) of load ordering logic 434a. Load hold logic 403 also receives partial address signals for the StOps in SU1 411 and SU2 412 stages of store unit 153 and for the LdOp in LU2 402 of load unit 152. Based on these inputs, load hold logic 403 selectively asserts a hold signal (LU2_Hold) stalling the LdOp in LU2 402 (and also subsequent LdOps) in accordance with the above RTL description.

LdOps (including Ops, operands, displacement values, and certain control signals) arrive at LU1 401 via respective busses and lines illustratively shown as collective bus 189. Memory locations addressed by LdOps in LU2 402 are accessed via data cache 170 when LU2_Hold is unasserted (or released) and supplied to execution units and scheduler 180 via a result bus 189.2 (not shown) of collective bus 189. Both stages of load unit 152 (LU1 401 and LU2 402) communicate with the data TLB 171 and with other memory management data structures residing at various levels in the memory hierarchy (L1 data cache 170, L2 cache 110, main memory, etc.) to resolve virtual (or linear) addresses to physical addresses.

Figure 5:
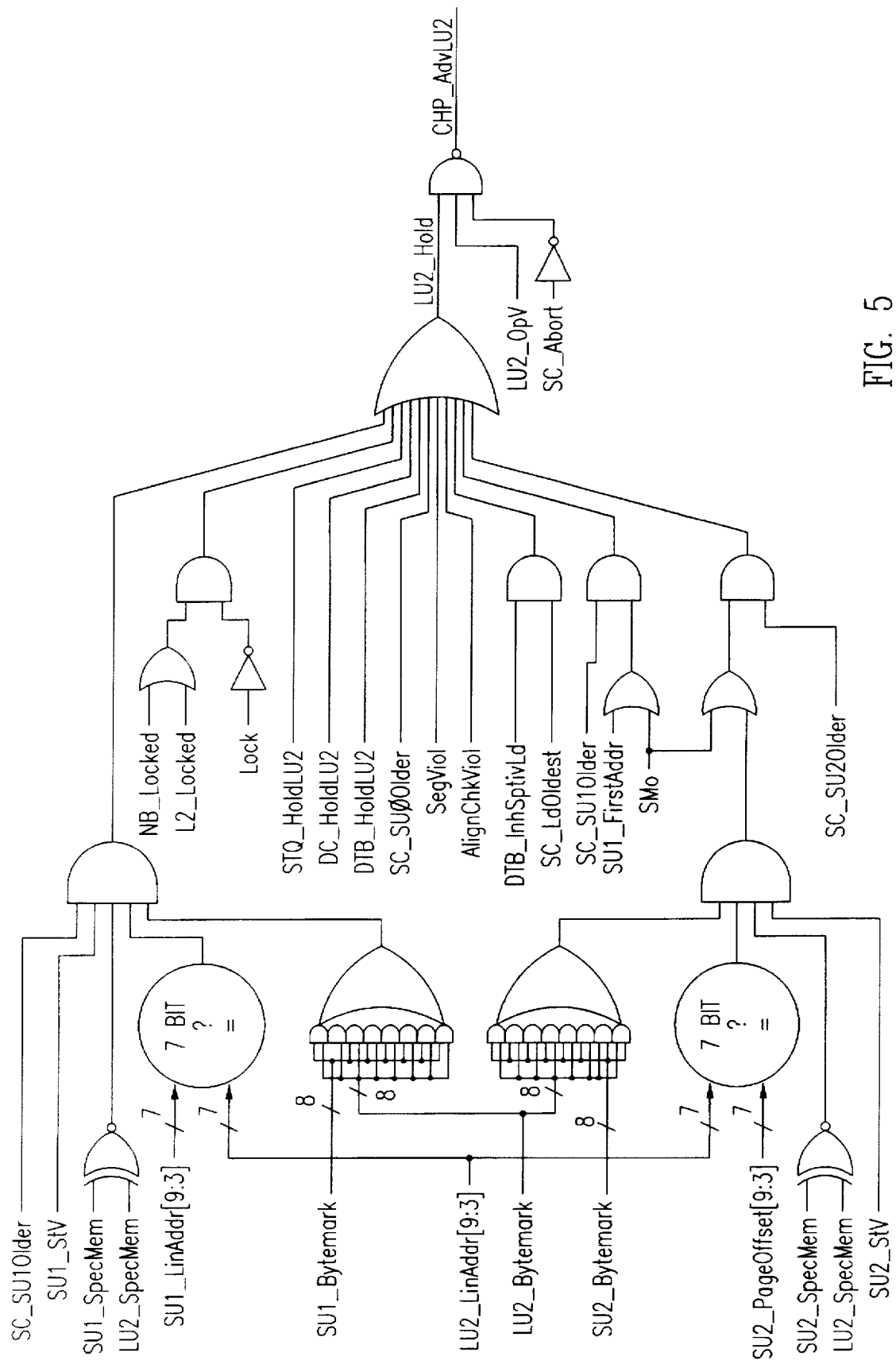
FIG. 5 is a circuit diagram of load hold logic in accordance with an embodiment of the present invention.

Those skilled in the art will recognize a variety of suitable implementations of load hold logic 403 conforming with the above-described RTL. Load hold logic 403 is any suitable implementation. FIG. 5 depicts one such suitable implementation in combinatorial logic.

Store Hold Logic

Store unit 153 includes analogous hold logic in the form of store hold logic 413 which checks for LdOps in various pipe stages that are older than the StOp in stage 2 (SU2 412) of store unit 153. Although the design of store hold logic 413 is analogous to load hold logic 403, the two are not symmetric. Store hold logic 413 checks for older LdOps in stage 1 (LUI 401) and stage 2 (LU2 402), i.e., stages 352 and 360 of FIG. 3. Two signals (SC_LU2OLDER and SC_LU1OLDER), which are supplied to store hold logic 413 by store ordering logic 434b, signal an older LdOp in stages 2 and 1, respectively. More precisely, SC_LU1OLDER indicates the presence of an older LdOp in stages of processing earlier than execution stage 2 (e.g., execution stage 1 352, operand fetch stage 0 340, or issue stage 330). Store hold logic 413 also receives a partial memory addresses for the StOp in stage 2 (SU2 412) of store unit 153 and selectively asserts a hold signal (SU2_Hold) to SU2 412 under conditions now described.

An older LdOp in stage 1 (or in an earlier stage) causes store hold logic 413 to unconditionally hold the current StOp in stage 2 of store unit 153. On the other hand, an older LdOp in stage 2 holds the current StOp only if there is also a match between the memory addresses for the StOp in stage 2 and older LdOp. The following RTL describes the design and operation of store hold logic 413:

```
//SU2 Hold Logic;
// *************;
// SU2 Partial Address Match with LU pipe Stage 2;
AddrMatch2 =
(LU2_PageOffset(9,3) == LinAddr(9,3)) && (LU2_ByteMark &
    ByteMark) &&
! (LU2_SpecMem ^ SU2_SpecMem);
// Hold (SU2 needs to Hold);
// Note that Load Validity is taken into account in the
    LUnOlder
// signals;
SU2_Hold =
StV &&
(SC_LU2Older && (AddrMatch2 || DTB_SUCacheDis ||
    LU2_SMO) || SC_LU1Older) || SUViol;
```

Store hold logic 413 supplies the SU2_Hold signal to SU2 412 to inhibit execution of a stage 2 StOp when any of the above-specified combinations of partial address matches (AddrMatch2) and relative age indications (SC_LU2OLDER and SC_LU1OLDER) from scheduler 180 are present. A younger StOp in stage 2 is unconditionally held up for an older stage 1 (or earlier) LdOp. As the older LdOp advances to stage 2, a partial address mismatch may establish that no ordering constraints are violated by out-of-order completion of the younger StOp and older LdOp and store hold logic 413 will release the hold in accordance with the SU2_Hold equation.

As with load hold logic 403, store hold logic 413 performs partial address matching based on the lower portions (i.e., LinAddr (9,3) and LU2_PageOffset (9,3)) of linear addresses for StOp and LdOps. Byte marks (ByteMark and LU2_ByteMark) are also included in the partial address match.

In the exemplary embodiment, store hold logic 413, like load hold logic 403, is over-inclusive in the set of conditions which trigger a hold. However, the design of store hold logic 413 is even more over-inclusive than load hold logic 403. For example, store hold logic 413 holds a younger stage 2 StOp for an older stage 1 LdOp checking for an address match. Alternative embodiments may more precisely (or less precisely) delimit the set of conditions which trigger a hold in store hold logic 413 and/or store hold logic 413. In the exemplary embodiment however, store hold logic 413 less precisely delimits hold conditions based on an estimate that in a typical instruction profile, LdOps will more often be dependent on StOps than vice versa.

Referring to FIG. 4, store hold logic 413 receives indications of the relative age of the LdOp in SU2 412 of store unit 153 from store ordering logic 434b. In particular, store hold logic 413 receives an SC_LU2OLDER indication and an SC_LU1OLDER indication from respective scan chains (LU2 older scan chain 434b.1 and LU1 older scan chain 434b.2) of store ordering logic 434b. Store hold logic 413 also receives partial address signals for the LdOps in the LU2 402 stage of load unit 152 and for the StOp in SU2 412 of store unit 153. Based on these inputs, store hold logic 413 selectively asserts a hold signal (SU2_Hold) stalling the StOp in SU2 412 (and also subsequent StOps) in accordance with the above RTL description.

StOps (including Ops, operands, displacement values, and certain control signals) arrive at SU1 411 via respective busses and lines illustratively shown as collective bus 189. Memory addresses and store operands for StOps in SU2 412 are provided to store queue 159 when SU2_Hold is unasserted (or released). In turn, store queue 159 writes store operands to the address space via data cache 170. Both stages of store unit 153 (SU1 411 and SU2 412) communicate with the data TLB 171 and with other memory management data structures residing at various levels in the memory hierarchy (L1 data cache 170, L2 cache 110, main memory, etc.) to resolve virtual (or linear) addresses to physical addresses.

Figure 6:
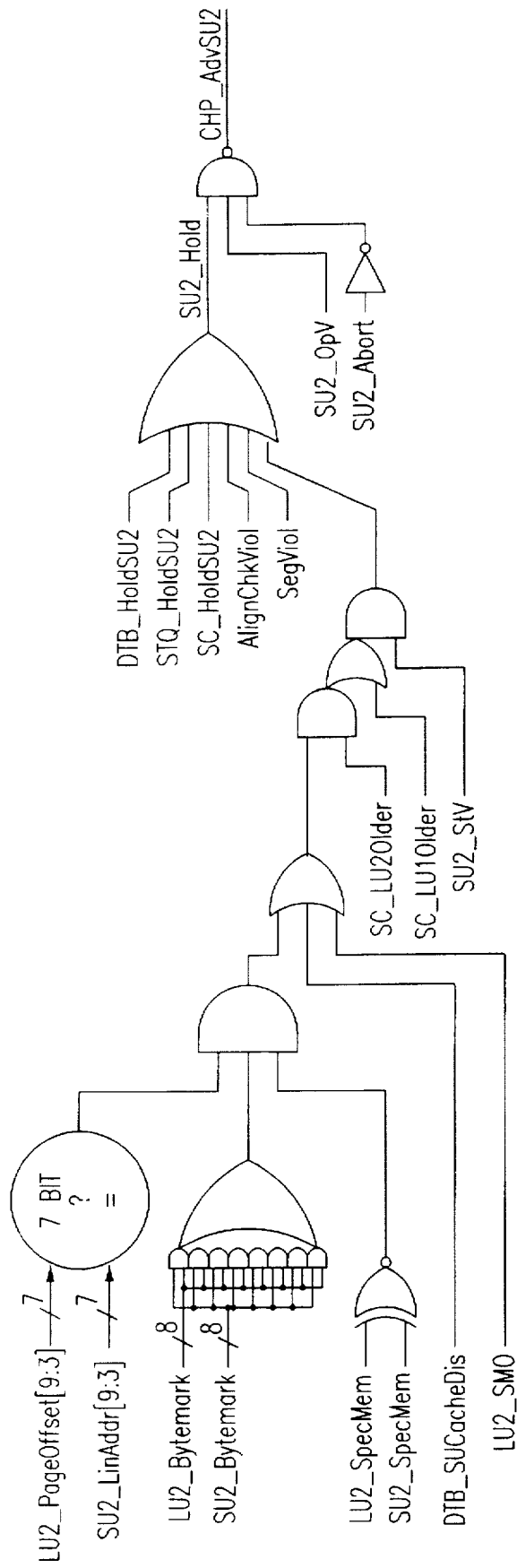
FIG. 6 is a circuit diagram of store hold logic in accordance with an embodiment of the present invention.

Those skilled in the art will recognize a variety of suitable implementations of store hold logic 413 conforming with the above-described RTL. Store hold logic 413 is any suitable implementation. FIG. 6 depicts one such suitable implementation in combinatorial logic.

Scheduler Logic including Scan Chains

Scheduler 180 also provides support for maintaining a sufficient execution ordering between LdOps and StOps. In the exemplary embodiment, this support is in the form of scan chains which supply relative age indications to load hold logic 403 and store hold logic 413. As described above, ordering is maintained by holding operations at stage 2 of the load and store pipelines (i.e., at LU2 402 and SU2 412). Execution ordering is maintained for StOps which reference memory locations. In the exemplary embodiment, no ordering is enforced for LEA StOps (Load Effective Address) which do not actually address memory, although CDA and CIA StOps (Check Data Effective Address and Check Instruction Effective Address) which generate faultable addresses are included in the ordering scheme to simplify circuit design. No LdOps are excluded from the ordering scheme since all LdOps reference memory. Alternative embodiments may include or exclude Ops such as LEA, CDA, and CIA StOps as appropriate.

Referring back to FIG. 2, load-store ordering logic 234 in scheduler 180 provides indications of the relative age of LdStOps with respect to particular LdOps and StOps in stage 2 of respective load and store execution units. Load-store ordering logic 234 accesses Type[2:0] fields 241 and State[3:0] fields 242 of each Op entry (illustratively of Op entry 240.1) in scheduling reservoir 240 and provides relative store age indications (e.g., SC_SU2OLDER, SC_SU1OLDER, and SC_SU0OLDER) to load unit 152 and relative load age indications (e.g., SC_LU2OLDER and SC_LU1OLDER) to store unit 153 via lines collectively shown as 189.5.

Referring now to FIG. 4, load-store ordering logic 234 is shown as load ordering logic 434a and store ordering logic 434b portions. For LdOps, load ordering logic 434a determines the relative age of the LdOp in LU1 401 with respect to the StOp (if any) in SU2 412, with respect to the StOp (if any) in SU1 411, and with respect to any other StOps in earlier stages of processing. For StOps, store ordering logic 434b determines the relative age of the StOp in SU1 411 with respect to the LdOp (if any) in LU2 402 and with respect to any other LdOps in earlier stages of processing.

FIG. 4 depicts load ordering logic 434a including three component scan chains, SU2 older scan chain 434a.1, SU1 older scan chain 434a.2, and SU0 older scan chain 434a.3. Each component scan chain uses Type[2:0] fields 241 and State[3:0] fields 242 (not shown) of Op entries in scheduling reservoir 240 to supply respective relative age indications. SU2 older scan chain 434a.1 supplies SC_SU2OLDER; SU1 older scan chain 434a.2 supplies SC_SU1OLDER; and SU0 older scan chain 434a.3 supplies SC_SU0OLDER.

The design of store ordering logic 434b is analogous to, but not symmetric with, load ordering logic 434a. In particular, store ordering logic 434b includes two component scan chains, LU2 older scan chain 434b.1 and LU1 older scan chain 434b.2. As with load ordering logic 434a, each component scan chain of store ordering logic 434b uses Type[2:0] fields 241 and State[3:0] fields 242 to supply respective relative age indications. LU2 older scan chain 434b.1 supplies SC_LU2OLDER and LU1 older scan chain 434b.2 supplies SC_LU1OLDER. Although shown as independent scan chains for purposes of illustration, those skilled in the art will recognize that load ordering logic 434a and store ordering logic 434b may share logic, e.g., Type[2:0] and State[3:0] detection circuitry, across component scan chains.

In the exemplary embodiment, the scan chains of load ordering logic 434a (i.e., SU2 older scan chain 434a.1, SU1 older scan chain 434a.2, and SU0 older scan chain 434a.3) include "propagate-kill" style scan chain logic which is a simplification over "generate-propagate-kill" carry-lookahead logic such as that used in high speed adders. Scan chains of store ordering logic 434b (i.e., LU2 older scan chain 434b.1 and LU1 older scan chain 434b.2) also include "propagate-kill" style scan chain logic. Logic simplifications over traditional "generate-propagate-kill" carry lookahead techniques arise from the observation that generate (G) terms are zero and propagate (P) terms are the complement of associated kill (K) terms. These simplifications are described in greater detail in a co-pending patent application entitled "Selection Scan Chain for Rapidly Identifying an Object in a Sequential List" U.S. patent application Ser. No. 08/592,722 filed on Jan. 26, 1996, naming Favor et al. as inventors, the detailed description of which is hereby incorporated by reference.

Load ordering logic 434a and store ordering logic 434b are now described with reference to FIG. 4. During a first phase of stage 2 (for a LdStOp), scan chains of load ordering logic 434a and store ordering logic 434b perform "propagate-kill" style scans (three for LdOps, two for StOps) across the entries of scheduler 180 from oldest to youngest. During a second phase of stage 2, multiplexing logic samples the Cin signal corresponding to the stage 2 LdStOp and supplies a relative age indication to hold logic (403 or 413). Focusing illustratively on a single scan chain, SU2 older scan chain 434a.1 performs a "propagate-kill" scan across the entries of scheduler 180 during the first phase of stage 2. Multiplexing logic 434a.4 samples from its associated scan chain (SU2 older scan chain 434a.1) the Cin signal corresponding to the Op entry for a LdOp in LU2 402. Multiplexing logic 434a.4 then supplies the $\overline{Cin}$ as the SC_SU2Older signal to load hold logic 403.

The design and operation of remaining scan chains of load ordering logic 434a are similar. For example, SU1 older scan chain 434a.2 scans the entries of scheduler 180 and associated multiplexing logic 434a.5 supplies the SC_SU1Older signal to load hold logic 403. Similarly, SU0 older scan chain 434a.3 scans the entries of scheduler 180 and associated multiplexing logic 434a.6 supplies the SC_SU0Older signal to load hold logic 403.

The scan chains of store ordering logic 434b are analogous. Focusing illustratively on a single scan chain, LU2 older scan chain 434b.1 performs a "propagate-kill" scan across the entries of scheduler 180 during the first phase of stage 2. Multiplexing logic 434b.4 samples from its associated scan chain (LU2 older scan chain 434b.1) the Cin signal corresponding to the Op entry for a StOp in SU2 412. Multiplexing logic 434b.4 then supplies the $\overline{Cin}$ as the SC_LU2Older signal to store hold logic 413. The design and operation of remaining scan chains of store ordering logic 434b are similar. For example, LU1 older scan chain 434b.2 scans the entries of scheduler 180 and associated multiplexing logic 434b.5 supplies the SC_LU1older signal to store hold logic 413.

A stage 2 LdOp (or stage 1 LdOp performing the first half of a misaligned load) requires three scan chains since the LdOp's age relative to three categories of StOps must be determined. Each scan chain of load ordering logic 434a scans for the first/oldest StOp in one of the three categories. The SU2 older scan chain 434a.1 detects a stage 2 StOp (or stage 1 StOp performing the first half of a misaligned store). The SU1 older scan chain 434a.2 detects a stage 1 StOp, and SU0 older scan chain 434a.3 detects a pre-stage 1 StOps. The state of the "carry" signal, Cin, at any point in the scan chain reflects whether a StOp of relevant state (as encoded by State[3:0] of the corresponding Op entry in scheduler 180) has been encountered/found. Thus, the Cin corresponding to an Op entry for a stage 2 LdOp provides the LdOp's age relative to StOps of the state detected by the particular scan chain. If Cin=1, the carry signal was not "killed" as it "propagated" up the scan chain from older to younger Op entries and no older StOp of the particular state exists. Based on these Cinindications, relative age indications (SC_SU2Older, SC_SU1Older, and SC_SU0Older) are supplied to load hold logic 403 which then determines which SU address comparator signals (AddrMatch1 or AddrMatch2) to examine and, more generally, whether to hold up the stage 2 LdOp.

A stage 2 StOp (or stage I StOp performing the first half of a misaligned store) requires two scan chains since the StOp's age relative to two categories of LdOps must be determined. Each scan chain of store ordering logic 434b scans for the first/oldest LdOp in one of the two categories. The LU2 older scan chain 434b.1 detects any stage 2 LdOp (or stage 1 LdOp performing the first half of a misaligned load). The LU1 older scan chain 434b.2 detects any prestage 2 LdOps. The state of the "carry" signal, Cin, at any point in the scan chain reflects whether a LdOp of relevant state (as encoded by State[3:0] of the corresponding Op entry in scheduler 180) has been encountered/found. The Cin corresponding to an Op entry for a stage 2 StOp provides the StOp's age relative to LdOps of the state detected by the particular scan chain. If Cin=1, the carry signal was not "killed" as it propagated up the scan chain from older to younger Op entries and no older LdOp of the particular state exists. Based on these Cinindications, relative age indications (SC_LU2Older and SC_LU1Older) are supplied to store hold logic 413, which determines whether to examine the LU stage 2 address comparator (AddrMatch2) and whether to hold up the stage 2 StOp.

Each scan chain (i.e., SU2 older scan chain 434a.1, SU1 older scan chain 434a.2, SU0 older scan chain 434a.3, LU2 older scan chain 434b.1, and LU1 older scan chain 434b.2) is a "propagate-kill" chain from the oldest to youngest entry of scheduler 180. The following RTL describes each of the five scan chains in terms of lookahead equations. The bit-level P/K terms are based only on the State[3:0] field (in particular, the S1, S2, and S3 bits) and Type[2:0] field (ST or LU) of an entry. For the three LdOp scan chains, the ST type bit is used instead of the SU bit. This distinguishes the StOps which actually reference memory from LEA operations which only generate logical addresses.

The RTL which follows, describes the operation of load ordering logic 434a and store ordering logic 434b, including multiplexing logic (434a.4, 434a.5, 434a.6, 434b.4, and 434b.5) and scan chains (434a.1, 434a.2, 434a.3, 434b.1, and 434b.2). In particular, Op entry equations labeled LUst2, LUst1, and LUst0 denote the P and K terms corresponding to each Op entry for the scan chains respectively enumerated above as SU2 older scan chain 434a.1, SU1 older scan chain 434a.2, and SU0 older scan chain 434a.3. Similarly, Op entry equations labeled SU1d2 and SU1d1 denote the P and K terms corresponding to each Op entry for the scan chains respectively enumerated above as LU2 older scan chain 434b.1 and LU1 older scan chain 434b.2.

| | Bit-level or Op Entry equations |
|---|---|
| LUst2: | ~P = K = ST ~S3 (S2 + S1 SU2_FirstAddrV) |
| LUst1: | ~P = K = ST ~S2 |
| LUst0: | ~P = K = ST ~S1 |
| SUld2: | ~P = K = LU ~S3 (S2 + S1 LU2_FirstAddrV) |
| SUld1: | ~P = K = LU ~S2 |

In the exemplary embodiment, (S2+S1 SU2_FirstAddrV) and (S2+S1 LU2_FirstAddrV) terms extend the Op entry equations to handle stalling of stage 1 LdStOps performing the first half of a misaligned memory access).

The scan chains of load ordering logic 434a and store ordering logic 434b are organized as carry-lookahead logic which are described by the following bit and group lookahead equations:

(Group lookahead equations based on four-bit groups)

Pgrp = P0 P1 P2 P3
CIn0 = Cin    // note: Op 0 is oldest Op within a quad
CIn1 = Cin P0

-continued

CIn2 = Cin P0 P1
CIn3 = Cin P0 P1 P2
Lookahead among Quads

CinGrp5 = 1    // note: Quad 5 is oldest quad
CinGrp4 = Pgrp5
CinGrp3 = Pgrp5 Pgrp4
CinGrp2 = Pgrp5 Pgrp4 Pgrp3
CinGrp1 = Pgrp5 Pgrp4 Pgrp3 Pgrp2
CinGrp0 = Pgrp5 Pgrp4 Pgrp3 Pgrp2 Pgrp1 wherein groups are four-bit groups. Those skilled in the art will recognize a variety of suitable implementations of scan chains including implementations using different group configurations.

Figure 7A:
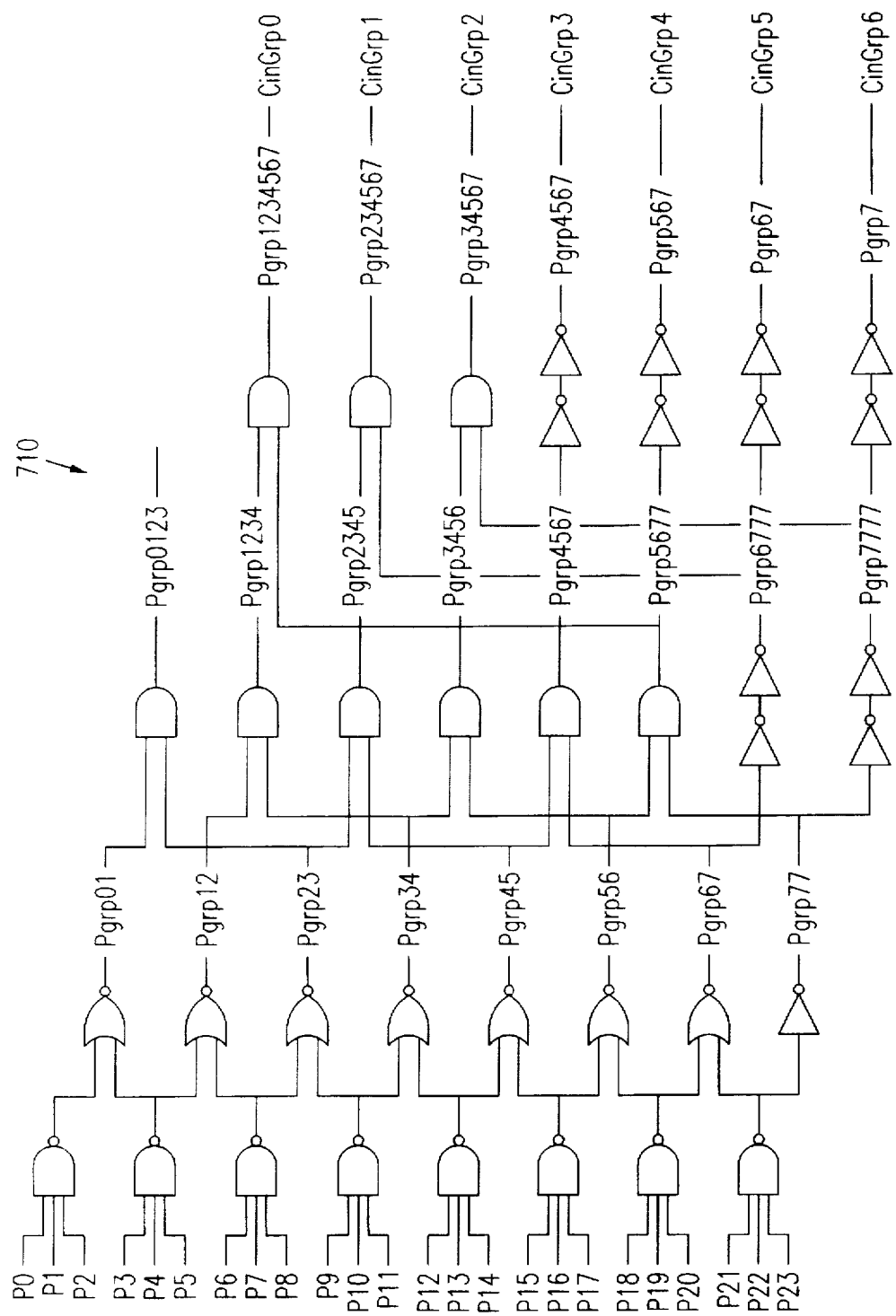
FIGS. 7A and 7B are a circuit diagram of a scan chain for load-store ordering logic in accordance with an embodiment of the present invention.
Figure 7B:
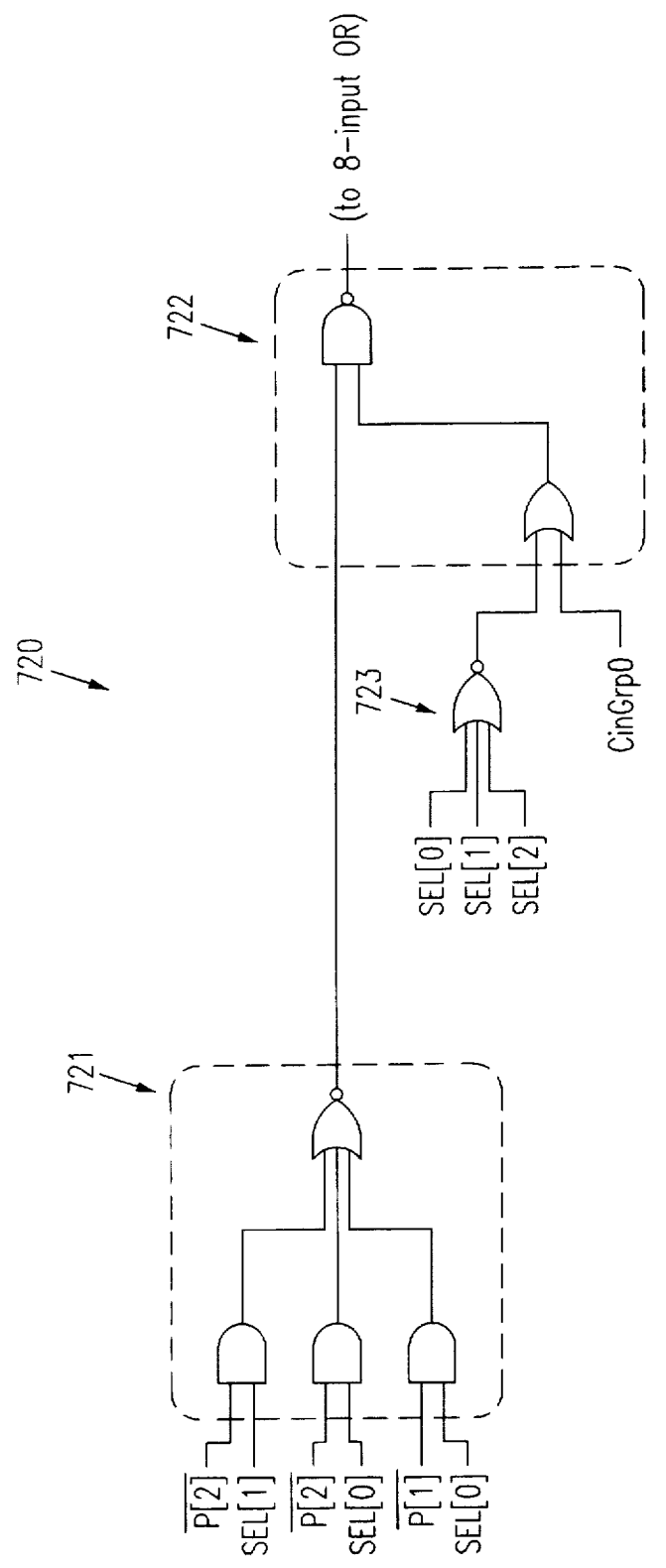

Relative age determinations can be accelerated by using tree structured lookahead logic. FIGS. 7A and 7B depict one such design based on 3-bit groups. FIG. 7A depicts an AND-tree 710 for generating seven of the eight group "carry in" signals, CinGrp0, CinGrp1, CinGrp2, CinGrp3, CinGrp4, CinGrp5, and CinGrp6, from the P (propagate) terms associated with each of the 24 Op entries of scheduler 180. The eighth "carry in" signal, CinGrp7, is a logical 1. In the embodiment of FIG. 7A, the first two levels of gates are shown as NAND and NOR gates, whereas subsequent levels are AND gates. Alternate embodiments may implement the canonical AND tree using AND gates, alternating levels of NAND and NOR gates, or combinations thereof. Signal rise times can be improved (along the generally longer lines connecting the later levels of gates) by implementing the later levels of the canonical AND tree as NAND-inverter pairs. Preferably, additional gate delays (e.g., the back-to-back inverters shown in FIG. 7A) are provided along signal paths, such as the CinGrp3, CinGrp4, CinGrp5, and CinGrp6 signal paths. In this way, fanout in the AND-tree can be limited to two (2), thereby improving the critical path timing characteristics of the AND-tree as compared with implementations having larger fanouts at certain gates. Implementations of scan chains 434a.1, 434a.2, 434a.3, 434b.1, and 434b.2 based on the logic of FIGS. 7A and 7B are analogous, though the nature of the P terms associated with each (e.g., P0, P1, P2, . . . P23) differs as described above with respect to the Op entry equations.

Returning now to the more generalized, RTL description of the scan chains of load ordering logic 434a (i.e., the scan chains defined above by the LUst2, LUst1, and LUst0 equations), the Cinvalues corresponding to each Op entry (e.g., the twenty-four LUst2chain. CIN values of the scan chain having entries defined above by the LUst2 equation, the twenty-four LUst1chain. CIN values of the scan chain having entries defined above by the Lust1 equation, and the twenty-four LUst0chain. CIN values of the scan chain having entries defined above by the Lust0 equation) are combined in accordance with the following RTL.

```
LUAges[2:0] = 3'b0
SUAges[1:0] = 2'b0
for (all Ops) {
   LUAges[2:0] |=
      (LU ~S3 (S2 + S1 LU2_FirstAddrV)) ?
         {~LUst2chain.CIN, ~LUst1chain.CIN, ~LUst0chain.CIN
         }
         : 3'b0
   SUAges[1:0] |=
      (SU ~S3 (S2 + S1 SU2_FirstAddrV)) ?
         {~SUld2chain.CIN, ~SUld1chain.CIN} : 2'b0
}
```

Focusing on the load ordering logic 434a definition, the three signals, LUAges[2:0], are outputs of multiplexing logic 434a.4, multiplexing logic 434a.5, and multiplexing logic 434a.6, receptively. The (LU ~S3 (S2+S1 LU2_FirstAddrV) term represents multiplexer selection logic selecting the particular Cinvalue corresponding to a stage 2 LdOp (or stage 1 LdOp performing the first half of a misaligned load).

Store ordering logic 434b is similar. For each of the two scan chains of store ordering logic 434b, the Cinvalues corresponding to each Op entry (i.e., the twenty-four SU1d2chain.CIN values of the scan chain having entries defined above by the SU1d2 equation and the twenty-four SU1d1chain.CIN values of the scan chain having entries defined above by the SU1d1 equation) are combined with 24:1 multiplexing logic defined also by the above RTL. Signals SuAges[1:0], are outputs of multiplexing logic 434b.4 and multiplexing logic 434b.5, receptively. The (SU ~S3 (S2+S1 SU2_FirstAddrv) term represents multiplexer selection logic selecting the particular Cinvalue corresponding to a stage 2 StOp (or stage 1 StOp performing the first half of a misaligned store).

The carry signals selected by multiplexing logic 434a.4, 434a.5, and 434a.6 are inverted and are respectively supplied to load hold logic 403 as SC_SU2Older, SC_SU1Older, and SC_SU0Older. Similarly, carry signals selected by multiplexing logic 434b.4 and 434b.5 are inverted and are respectively supplied to store hold logic 413 as SC_LU2Older and SC_SU1Older. Those skilled in the are will recognize a variety of suitable implementations for multiplexing logic.

FIG. 7B depicts a design for multiplexing logic 434a.4, 434a.5, 434a.6, 434b.4 and 434b.5 which provides accelerated generation of the respective LUAges[2:0] and LUAges [2:0] signals using group carry-in signals (CinGrp0, CinGrp1, CinGrp2, CinGrp3, CinGrp4, CinGrp5, CinGrp6, and CinGrp7) from the AND tree of FIG. 7A. For implementations of each scan chain (i.e., SC_SU2Older, SC_SU1Older, SC_SU0Older, SC_LU2Older and SC_SU1Older), signals associated with groups of three Op entries are combined in eight parallel logic blocks, illustratively logic block 720, and the eight resulting signals are combined in a two level OR structure (not shown) to provide the associated Ages signal. Each of the eight logic blocks can be implemented using three gates (i.e., NOR gate 723 and the pair of complex gates 721 and 722). Significantly, only a single gate delay (i.e., that associated with complex gate 722) is included in the critical path for providing the associated Ages signal. In logic block 720, the CinGrp0 input is the group 0 carry-in signal from FIG. 7A, the P[0], P[1], and P[2] inputs represent the Op entry level propagate terms associated with a given group of three, and the SEL[0], SEL[1], and SEL[2] terms are the associated Op entry selection terms. The seven remaining parallel logic blocks (not shown) are similar, receiving respective ones of the group carry-in signals, Op entry level propagate terms, and Op entry selection terms as inputs.

Implementations of multiplexing logic 434a.5, 434a.6, 434b.4 and 434b.5 based on the logic of FIG. 7B are analogous, though the nature of the P[N] terms associated with each differs as described above with respect to the Op entry RTL equations. Additionally, the nature of the SEL [N] terms differs depending on whether the scan chain is for identifying StOps older than a stage 2 LdOp or for identifying LdOps older than a stage 2 StOp. The SEL [N] inputs to the complex gates are provided by logic implementing the selection terms described above with reference to the above RTL, i.e., (LU ~S3 (S2+S1 LU2_FirstAddrV) for the LUx-Older scan chains and (SU ~S3 (S2+S1 SU2_FirstAddrV) for the SUxOlder scan chains.

System Embodiments

Figure 8:
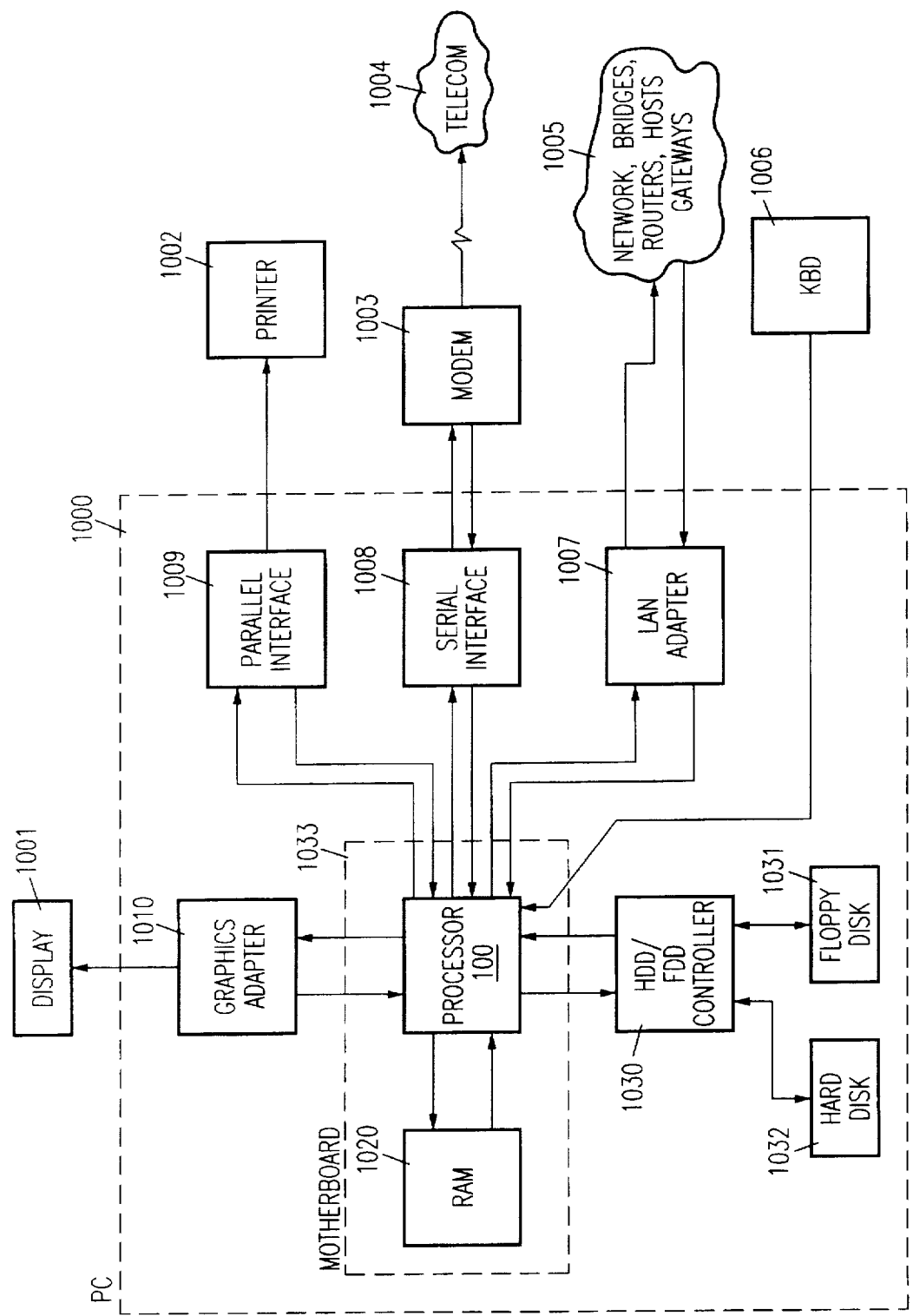
FIG. 8 is a block diagram of a personal computer incorporating a processor that provides out-of-order load store execution control in accordance with an embodiment of the present invention.
Figure 9:
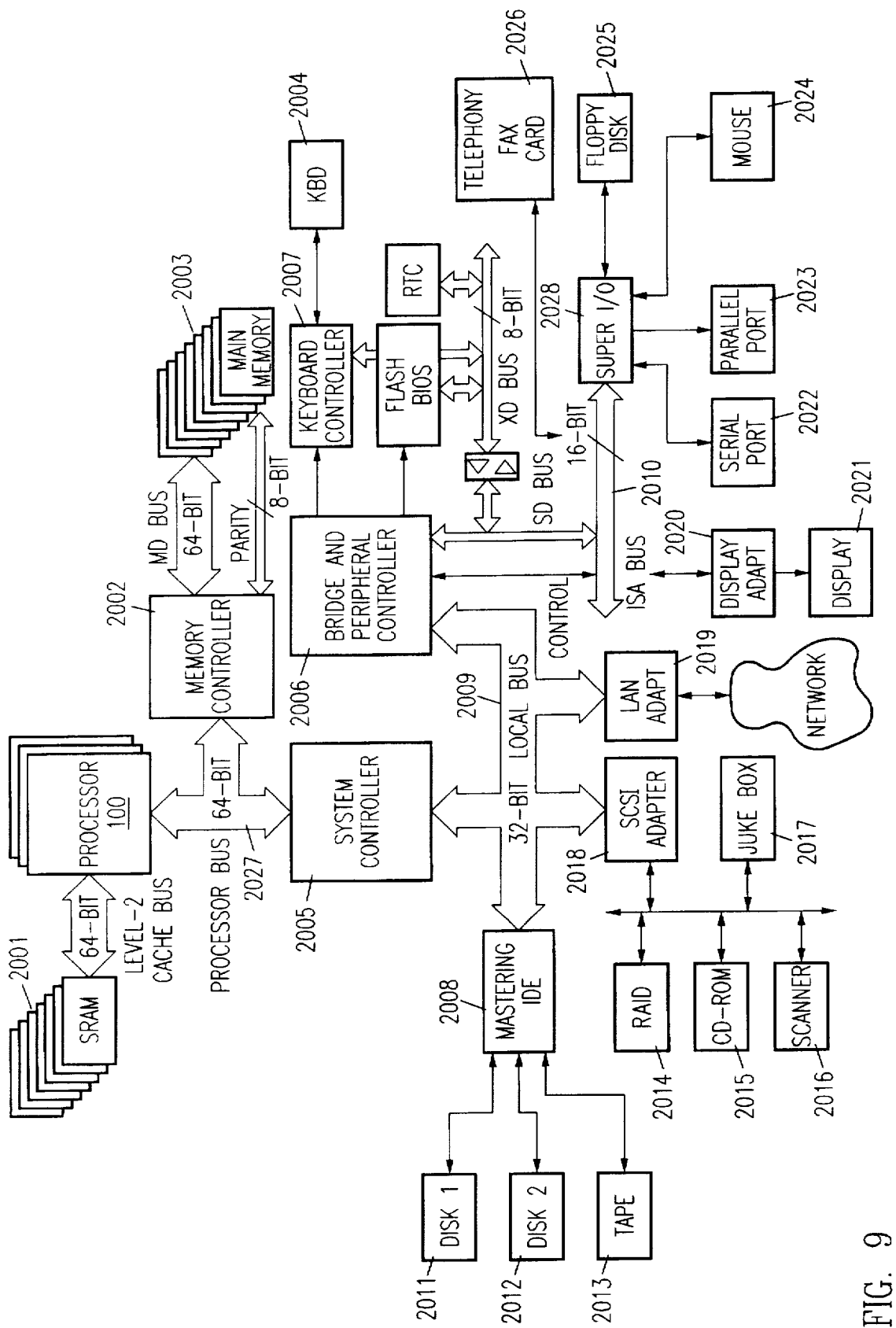
FIG. 9 is a block diagram of a networked server computer incorporating a processor that provides out-of-order load store execution control in accordance with an embodiment of the present invention.
Figure 10:
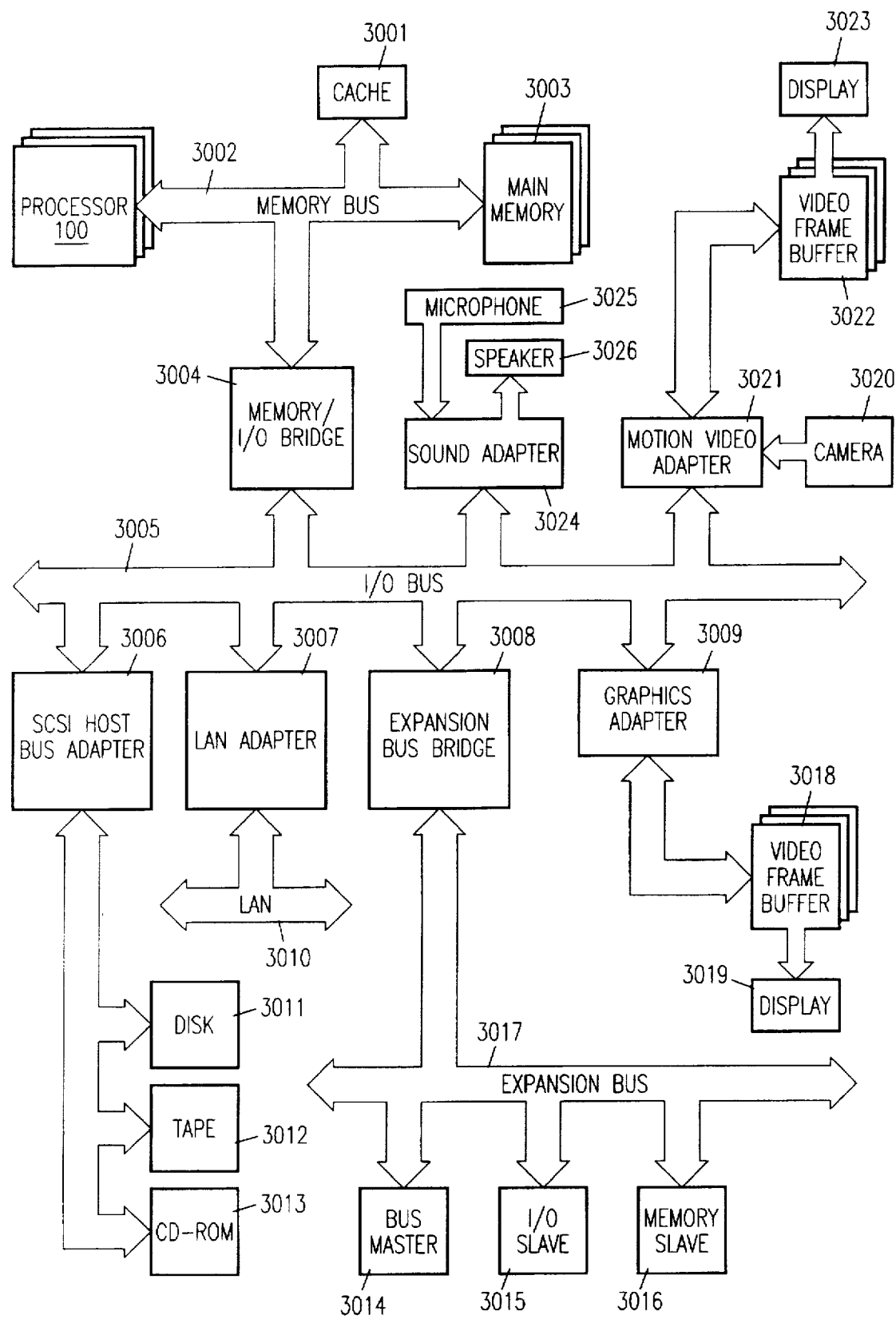
FIG. 10 is a block diagram of a multimedia computer incorporating a processor that provides out-of-order load store execution control in accordance with an embodiment of the present invention.

Superscalar processor 100 may be incorporated into a wide variety of system configurations, illustratively into standalone and networked personal computer systems, workstation systems, multimedia systems, network server systems, multiprocessor systems, embedded systems, integrated telephony systems, video conferencing systems, etc. FIGS. 8–10 depict an illustrative set of suitable system configurations for a processor, such as superscalar processor 100, that provides out-of-order load/store execution control. In particular, FIGS. 8–10 depict suitable combinations of a superscalar processor providing out-of-order load/store execution control (hereinafter, superscalar processor 100) with suitable, bus configurations, memory hierarchies and cache configurations, input/output (I/O) interfaces, controllers, devices, and peripheral components.

The set of system configurations depicted in FIGS. 8–10 is merely illustrative and alternate combinations of bus configurations, memory hierarchies, I/O interfaces, controllers, devices, and peripheral components are also suitable. For example, suitable configurations for a system incorporating superscalar processor 100 include combinations of components, cards, interfaces, and devices such as:

1. video display devices, monitors, flat-panel displays, and touch screens;
2. pointing devices and keyboards;
3. coprocessors, floating point processors, graphics processors, I/O controllers, and UARTs;
4. secondary and tertiary storage devices, controllers, and interfaces, caches, RAM, ROM, flash memory, static RAM, dynamic RAM
5. CD-ROMs, fixed disks, removable media storage devices, floppy disks, WORMs, IDE controllers, enhanced-IDE controllers, SCSI devices, scanners and jukeboxes;
6. PCMCIA interfaces and devices, ISA busses and devices, EISA busses and devices, PCI local busses and devices, VESA local busses and devices, Micro Channel Architecture busses and devices;
7. network interfaces, adapters and cards such as for Ethernet, token ring, 10Base-T, twisted pairs, untwisted pairs, ATM networks, frame-relay, ISDN, etc.;
8. video cards and devices, 2-D and 3-D graphics cards, frame buffers, MPEG/JPEG compression/decompression logic and devices, videoconferencing cards and devices, and video cameras and frame capture devices;
9. computer integrated telephony cards and devices, modem cards and devices, fax cards and devices;
10. sound cards and devices, audio and video input devices, microphones, and speakers;
11. data acquisition and control cards and interfaces, compression/decompression logic and devices, encryption/ decryption logic and devices; and
12. tape backup units, redundant/fault tolerant components and devices such as RAID and ECC memory.

Suitable combinations of such components, cards, interfaces, and devices (including those enumerated above as well as comparable components, cards, interfaces, and devices) are too numerous to list. However, those skilled in the art will appreciate the full set of suitable combinations and will recognize suitable couplings between such components, cards, interfaces, and devices. FIGS. 8–10 are illustrative of an exemplary subset of the full set of suitable combinations.

A networked personal computer incorporating superscalar processor 100 is shown in FIG. 8. Superscalar processor 100 is coupled to memory subsystem 1020. In the embodiment of FIG. 8, memory subsystem 1020 is shown as RAM, although alternative embodiments include a cache or caches interposed between the RAM and superscalar processor 100. Control logic and storage for such a cache may be distributed among the memory subsystem 1020 and the superscalar processor 100. For example, the level 1 caches (i.e., instruction cache 130 and data cache 170) and cache control logic 160 may be included in superscalar processor 100 as shown in FIG. 1 and the level 2 cache may be included as part of memory subsystem 1020. Alternative distributions are also suitable, although the level 1 caches are preferably on-chip with the out-of-order execution engine 150 (see FIG. 1) of superscalar processor 100.

In the embodiment of FIG. 8, superscalar processor 100 and memory subsystem 1020 are included as parts of motherboard 1033. A series of adapters, interfaces and controllers couple the processor to devices and peripheral components. These adapters, interfaces and controllers are typically coupled to the processor as cards in a backplane bus of motherboard 1033. However, alternative embodiments may incorporate individual adapters, interfaces and controllers into motherboard 1033. For example, graphics adapter 1010 may be included on motherboard 1033 with superscalar processor 100. In either case, graphics adapter 1010 is coupled to superscalar processor 100 via busses such as those described below with reference to FIGS. 9 and 10. Graphics adapter 1010 drives signals to control display 1001 in accordance with screen updates supplied by superscalar processor 100. Parallel interface 1009 and serial interface 1008 provide parallel port and serial port signaling interfaces for respectively interfacing to parallel port devices (e.g., printers such as parallel printer 1002, tape backup units, etc.) and to serial devices (e.g., modem 1003, pointing devices, and printers). In the embodiment of FIG. 8, parallel interface 1009 and serial interface 1008 are shown as separate interfaces although each is often incorporated with a hard disk/ floppy disk controller (such as 1030) as a multifunction card. Hard disk/ floppy disk controller 1030 controls access to the media of hard disk 1032 and to floppy disk 1031. Typically, hard disk/ floppy disk controllers such as hard disk/ floppy disk controller 1030 provide some level of buffering of reads and writes. Hard disk/ floppy disk controller 1030 may also provide limited caching for data transfers to and from the disk media.

Suitable designs for graphics adapter 1010, parallel interface 1009, serial interface 1008, and hard disk/floppy disk controller 1030 are well known in the art. For example, implementations of graphics adapter cards conforming to the VGA standard are commonly available and suitable designs are well known to those skilled in the art. Designs for parallel and serial interfaces, such as those conforming to the Centronics parallel interface and to the RS-232C serial interface specifications, respectively, are also well known to those skilled in the art. Similarly, designs for IDE and SCSI disk controllers are well known in the art and suitable implementations are commonly available. In each case, graphics adapter 1010, parallel interface 1009, serial interface 1008, and hard disk/ floppy disk controller 1030 are of any such suitable design.

Finally, LAN adapter 1007 provides a network interface to local area networks such as 802.3 Ethernet, 10base-T, twisted pair, and token ring networks. As with the other adapters and interfaces, LAN adapter 1007 is typically coupled to the processor as a card in the backplane bus of motherboard 1033. However, alternative embodiments may incorporate LAN adapter 1007 into motherboard 1033. Suitable cards and devices providing network interfaces are well known in the art and LAN adapter 1007 is any such suitable card or device.

Because of the high performance associated with its superscalar design, superscalar processor 100 is particularly attractive as the processor, or a one of multiple processors, in a network server configuration such as than shown in FIG. 9. In the network server configuration of FIG. 9, multiple instances of superscalar processor 100 are shown coupled to a level 2 cache 2001 and to a processor bus 2027. In the embodiment FIG. 9, superscalar processor 100 includes an on-board level 1 cache (i.e., instruction cache 130 and data cache 170) and level 2 cache control logic. The level 2 cache control logic (not shown) is coupled to level 2 cache 2001 via a 64-bit cache bus. Alternate embodiments of superscalar processor 100, such as the embodiment of FIG. 1, may offload the functionality of level 2 cache control logic. In such an alternative embodiment, level 2 cache control logic may be interposed between superscalar processor 100 and level 2 cache 2001. In the context of bus structures presented in FIG. 9, level 2 cache control logic could be coupled to superscalar processor 100 via processor bus 2027. Suitable modifications to the level 2 cache configuration of FIG. 9 will be apparent to those skilled in the art.

Referring again to FIG. 9, superscalar processor 100 is coupled to a memory controller 2002 and to a system controller 2005 via a 64-bit processor bus 2027. Memory controller 2002 provides a 64-bit interface to memory 2003 including an 8-bit parity interface to support Error Correcting Codes (ECC). ECC memory is desirable, but optional, and alternative embodiments may forgo the parity interface. System controller 2005 provides the interface (or bridge) between the 64-bit processor bus 2027 and the 32-bit local bus 2009. Local bus 2009 is any high-speed I/O bus, for example, a VESA Local bus (VL bus) or Peripheral Component Interconnect (PCI) bus. System controller 2005 provides buffering to support the potentially disparate clock rates of processor bus 2027 and local bus 2009. System controller 2005 arbitrates for use of the two busses (2027 and 2009) and may, in certain configurations, support burst data transactions across the two busses. Suitable designs for interbus bridges, such as system controller 2005 (bridging processor bus 2027 and local bus 2009) and bridge and peripheral controller 2006 (bridging local bus 2009 and ISA bus 2010, as described below) are well known in the art. For example, U.S. Pat. No. 5,414,820, "Crossing Transfers for Maximizing the Effective Bandwith of a Dual-Bus Architecture," to McFarland et al., the entirety of which is incorporated herein by reference, describes a design suitable for bridging a high-speed system bus and a slower I/O bus. System controller 2005 and bridge and peripheral controller 2006 are of any such suitable design.

Local bus 2009 couples to multiple local bus devices and components (illustratively, to IDE controller 2008, SCSI Adapter 2018, LAN Adapter 2019, and bridge and peripheral controller 2006). Certain of the local bus devices and components on local bus 2009 may optionally be provided as cards coupled to the local bus 2009 by a modular connector. In the embodiment of FIG. 9, IDE controller 2008, SCSI adapter 2018, and LAN adapter 2019 are provided as cards coupled to the local bus 2009 by a modular connector. Bridge and peripheral controller 2006 is directly connected to the local bus 2009. Alternate configurations (including configurations in which one or more of the IDE controller 2008, SCSI adapter 2018, and LAN adapter 2019 are directly connected to local bus 2009) are also suitable and will be appreciated by those skilled in the art. In addition, alternative embodiments may couple a display adapter to local bus 2009 thereby taking advantage of the generally higher bandwidth and throughput of local bus 2009 for screen updates (when compared to alternatives such as ISA, EISA, and Micro Channel Architecture busses). Because display device requirements are typically less demanding in network server configurations than in personal computer or workstation configurations, display adapter 2020 is shown coupled to the lower bandwidth ISA bus 2010.

IDE controller 2008 is representative of a variety of controller designs (including IDE, enhanced IDE, ATA, and Enhanced Small Device Interface (ESDI) controller designs) for interfacing storage devices such as disks, tape drives, and CD-ROMs. IDE controller 2008 is coupled to two disks (hard disk 2011 and floppy disk 2012) and to a tape backup unit 2013. Alternative configurations may interface an IDE/ enhanced IDE CD-ROM via IDE controller 2008, although a both a CD-ROM 2015 and a CD jukebox 2017 are interfaced via a Small Computer System Interface (SCSI) adapter 2018 in the embodiment of FIG. 9. Suitable designs for hard disks, floppy disks, CD-ROMs, and tape drives are all well known in the art and modular components based on those designs are commonly available for IDE, enhanced IDE, and ATA based controller designs. IDE controller 2008 is of any such suitable design, including enhanced IDE, ATA, and ESDI alternatives.

SCSI adapter 2018 is coupled to local bus 2009 and to multiple SCSI devices (illustratively, to a Redundant Array of Inexpensive Disks (RAID) 2014, CD-ROM 2015, scanner 2016, and CD jukebox 2017) in a daisy chain configuration. For illustrative purposes, the daisy chain of SCSI devices is shown as a bus in FIG. 9. Additional SCSI devices may also be coupled to SCSI adapter 2018 and additional SCSI adapters may be coupled to local bus 2009 to provide even larger numbers of SCSI device connections. Additionally, SCSI adapter 2018 and/or additional SCSI adapters may be coupled to an Industry Standard Architecture (ISA) bus such as ISA bus 2010, although coupling to a local bus such as local bus 2009 is generally preferable because of the higher bandwidth and throughput of local busses conforming to standards such as the VL bus or PCI standards.

In addition to the set of SCSI devices shown in FIG. 9, additional hard disks printers, LAN adapters and other computer systems may be coupled to superscalar processor 100 via a SCSI adapter such as SCSI adapter 2018. Additionally, SCSI adapter 2018 is representative of suitable alternative device adapters such as SCSI-2 and ESDI adapters. Suitable designs for RAIDs, scanners, CD-ROM jukeboxes, hard disks, CD-ROMs, printers, LAN adapters and tape drives are all well known in the art and modular components based on those designs are commonly available for SCSI adapter designs. SCSI adapter 2018 is of any such suitable design, including SCSI-2 and ESDI alternatives.

LAN adapter 2019 is coupled to local bus 2009 and, in the embodiment of FIG. 9, provides support for an IEEE 802.3 Carrier Sense Multiple Access with Collision Detection (CSMA/CD) local area network, although adapters for alternative network configurations and for media variations of an 802.3 network are also suitable. LAN adapter 2019 is therefore representative of suitable alternative device adapters such as those based on IEEE 802.x standards (e.g., 802.3 baseband Ethernet on coaxial media, twisted and untwisted pair media, and 10base-T, 802.3 broadband networks, 802.4 token passing networks, 802.5 token ring networks, etc.), and those based on Fiber Distributed Data Interface (FDDI) standards. Designs for such suitable network adapters are well known in the art and modular components based on those designs are commonly available for both VL bus and PCI bus connections. In addition, suitable designs for network adapters with ISA, SCSI, and SCSI-2 interfaces are also are well known in the art and modular components based on those designs are also commonly available. Alternative embodiments may therefore incorporate LAN adapters such as LAN adapter 2019 coupled to superscalar processor 100 via ISA bus 2010 or SCSI adapter 2018, although coupling to a local bus such as local bus 2009 is generally preferable to the ISA bus alternative because of the higher bandwidth and throughput of local busses conforming to standards such as the VL bus or PCI standards. LAN adapter 2019 is of any suitable design, for any suitable network topology and medium, and is coupled to any of the suitable bus structures (e.g., VL bus, PCI bus, ISA bus, SCSI, etc.).

ISA bus 2010 is coupled to local bus 2009 via bridge and peripheral controller 2006. Suitable bridges, like system controller 2005 bridge, are well known in the art and bridge and peripheral controller 2006 is of any suitable design. ISA bus 2010 provides a lower-speed (when compared to local bus 2009), 16-bit I/O bus and provides modular connections for a variety of peripheral components including display adapter 2020, telephony card 2026, and a multifunction I/O card such as super I/O 2028. Display adapters such as display adapter 2020 are well known in the art and provide varying degrees of support for advanced graphics functions. For example, simple text display adapters provide text and character based graphics only. More sophisticated display adapters, such as those implementing SVGA, XGA, VESA, CGA, and Hercules graphics standards provide multibit color and higher display resolutions. Specialized display adapters may provide more advanced features, such as hardware support for 24-bit color, 3-D graphics, hidden surface removal, lighting models, Gouraud shading, depth queuing, and texture mapping. As described above, display device requirements have typically been less demanding in network server configurations than in personal computer or workstation configurations. As a result, display adapter 2020 is shown coupled to the relatively low bandwidth ISA bus 2010. However, alternative embodiments may couple an advanced or specialized display adapter to local bus 2009 thereby taking advantage of the generally higher bandwidth and throughput of local bus 2009 for screen updates (when compared to alternatives such as ISA, EISA, and Micro Channel Architecture busses).

Super I/O 2028 provides support for a serial port 2022, a parallel port 2023, a pointing device 2024, and a disk 2025. Suitable designs for combination ISA cards such as super I/O 2028 are well known in the art and such cards are commonly available. Super I/O 2028 is of any such suitable design. Modems may be coupled via serial port 2022 and printers may be coupled via either the serial port 2022 or parallel port 2023 provided by super I/O 2028. Alternatively, a single function ISA card may be used for such purposes. Modem and fax/modem cards are one example of such a single function card. Telephony card 2026 is representative of cards providing voice, fax, and speech recognition, modem, fax-on-demand services, etc. Suitable telephony cards typically conform to standards defining a modular architecture for integrating computer-based application with telephony hardware. These standards include the Communicating Applications Specification (CAS) and the more comprehensive Signal Computing System Architecture (SCSA) standard. Telephony card 2026 is of any such suitable design.

Preferably, a high performance server configuration, such as that shown in FIG. 9, includes a hierarchy of busses with varying performance characteristics each matched to the devices and components coupled thereto. Those skilled in the art will recognize a variety of suitable variations on the bus hierarchy of FIG. 9, including the elimination of individual busses, the addition of multiple instances of individual busses, and redistribution of devices and components among the various busses. The server configuration of FIG. 9 is representative of all such suitable variations.

A multimedia workstation configuration for superscalar processor 100 shown in FIG. 10. As with the server configuration of FIG. 9, the multimedia workstation configuration includes a hierarchy of busses with varying performance characteristics each matched to the devices and components coupled thereto. Those skilled in the art will recognize a variety of suitable variations on the bus hierarchy of FIG. 10. Memory bus 3002 couples superscalar processor 100, cache 3001, memory 3003, and bridge 3004. As with the network server configuration of FIG. 9, a variety of cache configurations are suitable for a multimedia workstation. In the embodiment FIG. 10, superscalar processor 100 includes an on-board level 1 cache (i.e., the instruction cache 130 and data cache 170 of FIG. 1). A level 2 cache (i.e., cache 3001) including control logic is coupled to superscalar processor 100 via memory bus 3002. Alternate embodiments of superscalar processor 100, may incorporate functionality of level 2 cache control logic thereby enabling a direct connection to level 2 cache storage. Furthermore, alternative embodiments may relocate all cache support to cache 3001, although at least a level 1 cache is preferably on-chip with the out-of-order execution engine 150 (see FIG. 1) of superscalar processor 100. Suitable modifications to the cache configuration of FIG. 9 will be apparent to those skilled in the art.

I/O bus 3005 is comparable to local bus 2009 of FIG. 9 and is preferably a high speed I/O bus such as a VL bus or PCI bus. SCSI adapter 3006, LAN adapter expansion bus bridge 3008, graphics adapter 3009, sound adapter 3024, and motion video adapter 3021 are coupled to each other and to superscalar processor 100 via I/O bus 3005. SCSI adapter 3006, LAN adapter 3007, and expansion bus bridge 3008, together with the components and devices coupled to each are comparable to corresponding adapters, components, and devices discussed above with reference to FIG. 9.

In particular, SCSI adapter 3006 is coupled to multiple SCSI devices (illustratively, disk 3011, tape backup unit 3012, and CD-ROM 3013) in a daisy chain configuration. For illustrative purposes, the daisy chain of SCSI devices is shown as a bus. Additional SCSI devices may also be coupled to SCSI adapter 3006. Suitable designs for SCSI adapter 3006 are discussed above with reference to the comparable SCSI adapter 2018 of FIG. 9. Variations on the set of SCSI devices, and on SCSI configurations in general (each of which has been described above with reference to FIG. 9) are also applicable in the multimedia workstation configuration of FIG. 10. Similarly, suitable designs and variations on LAN adapter 3007 are also described above in the context of the comparable LAN adapter 2019 (see FIG. 9). Furthermore, suitable designs and variations on expansion bus 3017 are described above in the context of the comparable ISA bus 2010 (see FIG. 9). As described above, suitable designs for SCSI adapter 2018 and ISA bus 2010 are well known in the art and modular components based on such suitable designs are commonly available. SCSI adapter 3006, LAN adapter 3007, and expansion bus 3017 (together with the components and devices coupled thereto) are comparable. SCSI adapter 3006, LAN adapter 3007, expansion bus bridge 3008, and expansion bus 3017 are therefore also of any such suitable designs.

As shown above in FIG. 1, out-of-order execution engine 150 of superscalar processor 100 includes a multimedia unit 157 for executing multimedia extensions to the x86 instruction set. Referring again to FIG. 10, multimedia adapters, such as sound adapter 3024, motion video adapter 3021, and graphics adapter 3009, are each coupled to superscalar processor 100 via I/O bus 3005 and memory bus 3002 to provide for high-bandwidth transfers of multimedia data between the multimedia adapters, memory 3003, and secondary storage devices (e.g., disk 3011). Sound adapter 3024 provides digital-to-analog (D/A) and analog-to-digital (A/D) interfaces for respectively synthesizing and sampling audio signals. The D/A and A/D interfaces of sound adapter 3024 are respectively coupled to an audio performance device, such as a speaker 3026, and an audio signal acquisition device, such as a microphone 3025. Other suitable audio performance devices include mixing consoles, signal processing devices, synthesizers, MIDI sequencers and power amplifiers. Other suitable audio signal acquisition devices include signal processing devices and digital samplers. Suitable designs for sound cards are well known in the art and sound adapter 3024 is of any such suitable design.

Motion video adapter 3021 provides support for capture and compression of video signals, for example, from video camera 3020. In addition, motion video adapter 3021 supplies a display device 3023 such as a television, high-definition television, or a high resolution computer monitor with display signals via a frame buffer 3022. Alternative embodiments of motion video adapter 3021 may eliminate the frame buffer 3022 and directly drive a raster display. Furthermore, alternative embodiments of motion video adapter 3021 may decouple the video input and video output functionality of motion video adapter 3021, and instead provide separate video input and video output components.

Because video information requires large amounts of storage space, it is generally compressed. Accordingly, to display compressed video information, for example from data represented on a compact disk in CD-ROM 3013, the compressed video information must be decompressed. High bandwidth burst mode data transfers are supported by I/O bus 3005, which is preferably a local bus such as PCI with support for arbitrary length burst data transfers. In the multimedia workstation configuration of FIG. 10, video compression and decompression can be performed by superscalar processor 100 (executing multimedia instructions in multimedia unit 157) and/or by motion video adapter 3021. Thus, memory bus 3002 and bridge 3004 preferably support burst data transfers across the bridge (3004) between memory bus 3002 and I/O bus 3005. Suitable designs for motion video adapters typically provide support for the Moving Pictures Expert Group (MPEG) standards for video encoding and decoding (e.g., MPEG-1 and MPEG-2) and for JPEG. In addition, motion video adapter 3021 may support video conferencing by providing implementing video compression/decompression algorithms in accordance with H.261 (the standard compression algorithm for H.320 videoconferencing). Suitable designs for implementing such compression/decompression algorithms are well known in the art and motion video adapter 3021 is of any such suitable design.

Graphics adapters such as graphics adapter 3009 are well known in the art and provide varying degrees of support for advanced graphics functions. For example, graphics adapters, such as those implementing SVGA, XGA, VESA, CGA, and Hercules graphics standards provide multibit color and higher display resolutions. Specialized display adapters may provide more advanced features, such as hardware support for 24-bit color, 3-D graphics, hidden surface removal, lighting models, Gouraud shading, depth queuing, and texture mapping. Suitable designs for graphics adapters are well known in the art and modular components based on these designs are commonly available. Graphics adapter 3009 is of any such suitable design. Alternative embodiments my combine the graphics display functionality of graphics adapter 3009 with the motion video display functionality of motion video adapter 3021 outputting on a single high-resolution display device.

While the invention has been described with reference to various embodiments, it will be understood that these embodiments are illustrative and that the scope of the invention is not limited to them. Many variations, modifications, additions, and improvements of the embodiments described are possible. For example, the organization of Op entries in scheduler 180 as Op quads is merely illustrative. Alternative embodiments may incorporate other structures and/or methods for representing the nature and state of operations in a computer having multiple and/or pipelined execution units. Furthermore, alternative embodiments may incorporate different hierarchies of memories and caches, for example L1 and L2 caches.

Alternative embodiments may provide for a different distribution of structures and functionality within the load unit 152 and the store unit 153. For example, the load unit 152 and the store unit 153 may be independently modified to include larger or smaller numbers of execution stages. Structures for address comparison may be distributed differently between the load unit 152 and the store unit 153. Furthermore, alternate embodiments may incorporate larger or smaller numbers of scan chains for holding LdOps and StOps. Address comparison may be eliminated in favor of a more conservative hold policy. Additionally, structures and functionality presented as hardware in the exemplary embodiment may be implemented as software, firmware, or microcode in alternative embodiments. These and other variations, modifications, additions, and improvements may fall within the scope of the invention as defined in the claims which follow.

CROSS-REFERENCE

The present invention is related to subject matter disclosed in the following co-pending patent applications:

1. U.S. patent application entitled, "Instruction Predecode and Multiple Instruction Decode," U.S. patent application Ser. No. 08/592,207, filed on Jan. 26, 1996, naming John G. Favor and Amos Ben-Meir as inventors;
2. U.S. patent application entitled, "Instruction Buffer Organization Method and System," U.S. patent application Ser. No. 08/593,765, filed on Jan. 26, 1996, naming John G. Favor as inventor;
3. U.S. patent application entitled, "Self-Modifying Code Handling System" U.S. patent application Ser. No. 08/592,150 filed on Jan. 26, 1996, naming Amos Ben-Meir and John G. Favor as inventors;
4. U.S. patent application entitled, "Out-of-Order Processing With Operation Bumping to Reduce Pipeline Delay," U.S. patent application Ser. No. 08/590,568 filed on Jan. 26, 1996, now abandoned, naming John G. Favor and Amos Ben-Meir as inventors;
5. U.S. patent application entitled, "Scan Chain for Rapidly Identifying First or Second Objects of Selected Types In A Sequential List," U.S. patent application Ser. No. 08/592,722 filed on Jan. 26 1996, naming John G. Favor, Amos Ben-Meir and Jeffrey E. Trull as inventors;
6. U.S. patent application entitled, "Instruction Decoder Including Two-Way Emulation Code Branching," U.S. patent application Ser. No. 08/592,210 filed on Jan. 26, 1996, naming John G. Favor as inventor;
7. U.S. patent application entitled, "Instruction Decoder Including Emulation Using Indirect Specifiers," U.S. patent application Ser. No. 08/592,208 filed on Jan. 26, 1996, naming John G. Favor as inventor;
8. U.S. patent application entitled, "RISC 86 Instruction Set," U.S. patent application Ser. No. 08/592,151 filed on Jan. 26 1996, naming John G. Favor as inventor; and
9. U.S. patent application entitled, "Flexible Implementation of a System Management Mode (SMM) in a Processor," U.S. patent application Ser. No. 08/592,149 on Jan. 26 1996, naming John G. Favor and Frederick D. Weber as inventors;
10. U.S. patent application entitled, "Design for a Simulation Module Using an Object-Oriented Programming Language," U.S. patent application Ser. No. 08/592,041 filed on Jan. 26, 1996, naming Warren G. Stapleton as inventor;
11. U.S. patent application entitled, "Method for Analyzing The Performance of a Microprocessor," U.S. patent application Ser. No. 08/592,828 filed on Jan. 26, 1996, naming Warren G. Stapleton as inventor;
12. U.S. patent application entitled, "Method for Simulating Cache Operation," U.S. patent application Ser. No. 08/592,829 filed on Jan. 26, 1996, naming Warren G. Stapleton as inventor;
13. U.S. patent application entitled, "Unified Multi-Function Operation Scheduler for Out-Of-Order Execution In A Superscalar Processor" U.S. patent application Ser. No. 08/590,383 filed on Jan. 26, 1996, naming John G. Favor, Amos Ben-Meir and Warren G. Stapleton as inventors;

each of which is incorporated herein by reference, in its entirety.

What is claimed is:

1. In a processor having a load unit and a store unit, a load/store execution controller for allowing load and store instructions to execute generally out-of-order with respect to each other while enforcing data dependencies between the load and store instructions, the load/store execution controller comprising:

an age ordered array of scheduler operation entries, each scheduler operation entry indicative of a corresponding operation in an operation sequence;

load hold logic coupled to the load unit to selectively inhibit execution of a load operation in the load unit upon receipt of a store older indication; and scan chain logic coupled to the operation entries and to the load hold logic, the scan chain logic supplying store older indications indicating the presence of an older store operation relative to a load operation in the load unit.

2. A load/store execution controller, as recited in claim 1, wherein the scheduler operation entries include operation type and operation state fields; and wherein the scan chain logic is coupled to receive the operand type and operand state fields.

3. A load/store execution controller, as recited in claim 2, wherein the store older indications include first and second store older indications, the first store older indication indicating the presence of an older store operation in a preliminary stage of store operation evaluation, the second store older indication indicating the presence of an older store operation in a first execution stage of store operation evaluation, the scan chain logic differentiating between stages of store operation evaluation with the operation state fields.

4. A load/store execution controller, as recited in claim 3, wherein the store older indications further include a third store older indication indicating the presence of an older store operation in a second execution stage of store operation evaluation.

5. A load/store execution controller, as recited in claim 3, wherein the load hold logic comprises:
   first address match logic coupled to the store unit to receive a first store target address corresponding to a store operation in the first execution stage of store operation evaluation, the first address match logic matching the first store target address against the target address for the load operation;
wherein the load hold logic inhibits execution of the load operation in response to the first store older indication, and wherein the load hold logic inhibits execution of the load operation in response to the second store older indication when the first address match logic indicates a match between the first store target address and the target address for the load operation.

6. A load/store execution controller, as recited in claim 4, wherein the load hold logic comprises:
   first address match logic coupled to the store unit to receive a first store target address corresponding to a store operation in the first execution stage of store operation evaluation, the first address match logic matching the first store target address against the target address for the load operation; and
   second address match logic coupled to the store unit to receive a second store target address corresponding to a store operation in the second execution stage of store operation evaluation, the second address match logic matching the second store target address against the target address for the load operation;
wherein the load hold logic inhibits execution of the load operation in response to the first store older indication, wherein the load hold logic inhibits execution of the load operation in response to the second store older indication when the first address match logic indicates a match between the first store target address and the target address for the load operation, and wherein the load hold logic inhibits execution of the load operation in response to the third store older indication when the second address match logic indicates a match between the second store target address and the target address for the load operation.

7. A load/store execution controller, as recited in claim 5, wherein the first address match logic performs a partial address match, matching only a subset of the bits of the first store target address against corresponding bits for the target address of the load operation.

8. A load/store execution controller, as recited in claim 6, wherein the first and the second address match logic perform partial address matches, respectively matching only a subset of the bits of the first store target address and of the second store target address against corresponding bits of the target address for the load operation.

9. In a processor having a load unit and a store unit, a load/store execution controller for allowing load and store instructions to execute generally out-of-order with respect to each other while enforcing data dependencies between the load and store instructions, the load/store execution controller comprising:
   an age ordered array of scheduler operation entries, each scheduler operation entry indicative of a corresponding operation in an operation sequence;
   store hold logic coupled to the store unit to selectively inhibit execution of a store operation in the store unit upon receipt of a load older indication; and
   scan chain logic coupled to the operation entries and to the store hold logic, the scan chain logic supplying load older indications indicating the presence of an older load operation relative to a store operation in the store unit.

10. A load/store execution controller, as recited in claim 3, wherein the scan chain logic comprises:
   a first propagate-kill scan chain from older to younger ones of the scheduler operation entries, the first propagate-kill scan chain supplying the first store older indication when the state and type fields of the scheduler operation entries indicate a store operation in the preliminary stage of store operation evaluation older than the load operation in the load unit; and
   a second propagate-kill scan chain from older to younger ones of the scheduler operation entries, the second propagate-kill scan chain supplying the second store older indication when the state and type fields of the scheduler operation entries indicate a store operation in the first execution stage of store operation evaluation older than the load operation in the load unit.

11. A load/store execution controller, as recited in claim 4, wherein the scan chain logic comprises:
   a first propagate-kill scan chain from older to younger ones of the scheduler operation entries, the first propagate-kill scan chain supplying the first store older indication when the state and type fields of the scheduler operation entries indicate a store operation in the preliminary stage of store operation evaluation older than the load operation in the load unit;
   a second propagate-kill scan chain from older to younger ones of the scheduler operation entries, the second propagate-kill scan chain supplying the second store older indication when the state and type fields of the scheduler operation entries indicate a store operation in the first execution stage of store operation evaluation older than the load operation in the load unit; and
   a third propagate-kill scan chain from older to younger ones of the scheduler operation entries, the third propagate-kill scan chain supplying the third store older indication when the state and type fields of the scheduler operation entries indicate a store operation in the second execution stage of store operation evaluation older than the load operation in the load unit.

12. A load/store execution controller, as recited in claim 1, wherein the scan chain logic comprises:
   a first propagate-kill scan chain from older to younger ones of the scheduler operation entries, the first propagate-kill scan chain supplying the first store older indication in response to the presence of a store operation in a scheduler operation entry older than a scheduler operation entry associated with the load operation, operation entry level propagate and kill terms of the first propagate-kill scan chain being functions of the state and type fields of scheduler operation entries.

13. A load/store execution controller, as recited in claim 3, wherein the scan chain logic comprises:

a first propagate-kill scan chain from older to younger ones of the scheduler operation entries, the first propagate-kill scan chain supplying the first store older indication in response to the presence of a first store operation in a first one of the scheduler operation entries, wherein state and type fields of the first one of the scheduler operation entries indicate that the first store operation includes a store operation in a preliminary stage of store operation evaluation, and wherein the first one of the scheduler operation entries is older than a scheduler operation entry associated with the load operation; and a second propagate-kill scan chain from older to younger ones of the scheduler operation entries, the second propagate-kill scan chain supplying the second store older indication in response to the presence of a second store operation in a second one of the scheduler operation entries, wherein state and type fields of the second one of the scheduler operation entries indicate that the second store operation includes a store operation in a first execution stage of store operation evaluation, and wherein the second one of the scheduler operation entries is older than the scheduler operation entry associated with the load operation.

14. A load/store execution controller, as recited in claim 4, wherein the scan chain logic comprises:

a first propagate-kill scan chain from older to younger ones of the scheduler operation entries, the first propagate-kill scan chain supplying the first store older indication in response to the presence of a first store operation in a first one of the scheduler operation entries, wherein state and type fields of the first one of the scheduler operation entries indicate that the first store operation includes a store operation in a preliminary stage of store operation evaluation, and wherein the first one of the scheduler operation entries is older than a scheduler operation entry associated with the load operation;

a second propagate-kill scan chain from older to younger ones of the scheduler operation entries, the second propagate-kill scan chain supplying the second store older indication in response to the presence of a second store operation in a second one of the scheduler operation entries, wherein state and type fields of the second one of the scheduler operation entries indicate that the second store operation includes a store operation in a first execution stage of store operation evaluation, and wherein the second one of the scheduler operation entries is older than the scheduler operation entry associated with the load operation; and a third propagate-kill scan chain from older to younger ones of the scheduler operation entries, the third propagate-kill scan chain supplying the third store older indication in response to the presence of a third store operation in a third one of the scheduler operation entries, wherein state and type fields of the third one of the scheduler operation entries indicate that the third store operation includes a store operation in a second execution stage of store operation evaluation, and wherein the third one of the scheduler operation entries is older than the scheduler operation entry associated with the load operation.

15. A load/store execution controller, as recited in claim 1, wherein the scan chain logic comprises:

an AND-tree of operation entry level propagate signals, the AND-tree supplying a plurality of carry-in signals in response to the operation entry level propagate signals, the operation entry level propagate signals being functions of the operand type and operand state fields of the corresponding scheduler operation entry; and multiplexing logic coupled to the AND-tree to receive the carry-in signals, the multiplexing logic selective for a particular one of the carry-in signals corresponding to a scheduler operation entry associated with the load operation in the load unit.

16. A load/store execution controller, as recited in claim 15:

wherein the AND-tree supplies a plurality of group carry-in signals in response to the operation entry level propagate signals, the group carry-in signals corresponding to a group of scheduler operation entries; and wherein the multiplexing logic comprises:

group logic blocks each responsive to a first conjunction between the corresponding group carry-in signal and any of a plurality of selection signals indicating the presence of the load operation within the group of scheduler operation entries, each of the group logic blocks also responsive to a second conjunction between one operation entry level propagate signals and a corresponding one of the selection signals; and an OR-structure coupled to each of the group logic blocks and supplying one of the store older indications.

17. A load/store execution controller, as recited in claim 15, wherein the scan chain logic is organized as eight groups of three operation entries per group.

18. A load/store execution controller, as recited in claim 16, wherein the AND-tree includes earlier and later stages, the earlier stages implemented as alternating stages of NAND and NOR gates and the later stages implemented as NAND-inverter pairs wherein the inverters are spaced to improve the signal rise time characteristics along generally longer lines connecting the later stages.

19. A load/store execution controller, as recited in claim 16, wherein the AND-tree includes delay elements along certain of the group carry-in signal paths to substantially equalize aggregate delays along all of the group carry-in signal paths.

20. A load/store execution controller, as recited in claim 9, wherein the scan chain logic comprises:

an AND-tree of operation entry level propagate signals, the AND-tree supplying a plurality of carry-in signals in response to the operation entry level propagate signals, the operation entry level propagate signals being functions of the operand type and operand state fields of a corresponding scheduler operation entry; and multiplexing logic coupled to the AND-tree to receive the carry-in signals, the multiplexing logic selective for a particular one of the carry-in signals corresponding to a scheduler operation entry associated with the store operation in the store unit.

21. A computer system comprising:

a memory subsystem which stores data and instructions; and a processor operably coupled to access the data and instructions stored in the memory subsystem, the processor including a load unit, a store unit, and a load/store execution controller for allowing load and store instructions to execute generally out-of-order with respect to each other while enforcing data dependencies between the load and store instructions, the load/store execution controller of the processor comprising:

an age ordered array of scheduler operation entries, each scheduler operation entry indicative of a corresponding operation in an operation sequence;

load hold logic coupled to the load unit to selectively inhibit execution of a load operation in the load unit upon receipt of a store older indication; and scan chain logic coupled to the operation entries and to the load hold logic, the scan chain logic supplying store older indications indicating the presence of an older store operation relative to a load operation in the load unit.

22. The computer system of claim 21, wherein the processor and the memory subsystem are components of a motherboard.

23. The computer system of claim 22, wherein the motherboard further comprises a backplane bus operably connected to the processor, and wherein the computer system further comprises one or more devices on cards connected to the motherboard via the backplane bus.

24. The computer system of claim 21, further comprising a parallel device interface operably coupled to the processor.

25. The computer system of claim 24, further comprising a printer connected to the processor via the parallel interface.

26. The computer system of claim 21, further comprising a serial device interface operably coupled to the processor.

27. The computer system of claim 26, further comprising a modem connected to the processor via the serial interface.

28. The computer system of claim 21, further comprising a graphics adapter operably coupled to the processor.

29. The computer system of claim 28, further comprising a video display connected to the processor via the graphics adapter.

30. The computer system of claim 21, further comprising a local area network adapter operably coupled to the processor.

31. The computer system of claim 30, further comprising a network of devices connected to the processor via the network adapter.

32. The computer system of claim 21, further comprising a disk controller operably coupled to the processor.

33. The computer system of claim 32, further comprising a hard disk connected to the processor via the disk controller.

34. The computer system of claim 32, further comprising a floppy disk connected to the processor via the disk controller.

35. A network server computer system incorporating a superscalar processor providing out-of-order load store execution control, the network server computer system comprising:

a superscalar processor including a load unit, a store unit, and a load/store execution controller for allowing load and store instructions to execute generally out-of-order with respect to each other while enforcing data dependencies between the load and store instructions, the load/store execution controller of the processor comprising:

an age ordered array of scheduler operation entries, each scheduler operation entry indicative of a corresponding operation in an operation sequence;

load hold logic coupled to the load unit to selectively inhibit execution of a load operation in the load unit upon receipt of a store older indication; and scan chain logic coupled to the operation entries and to the load hold logic, the scan chain logic supplying store older indications indicating the presence of an older store operation relative to a load operation in the load unit;

a memory coupled to the superscalar processor via a processor bus;

a local bus and an input/output bus;

first and second bridges, respectively coupling the processor bus to the local bus and the local bus to the input/output bus; and a local area network (LAN) adapter coupled to one of the local bus and the input/output bus.

36. A network server, as recited in claim 35, further comprising:

a data storage device coupled to one of the local bus and the input/output bus.

37. A network server, as recited in claim 36, wherein the storage device comprises a hard disk.

38. A network server, as recited in claim 36, wherein the storage device comprises a tape unit.

39. A network server, as recited in claim 36, wherein the storage device comprises a CD-ROM.

40. A network server, as recited in claim 36, wherein the storage device comprises a jukebox.

41. A network server, as recited in claim 36, wherein the storage device comprises a RAID.

42. A network server, as recited in claim 36, wherein the storage device comprises a flash memory.

43. A network server, as recited in claim 37, wherein the hard disk is selected from the group consisting of an IDE disk, an enhanced IDE disk, an ATA disk, an ESDI disk, and a SCSI disk.

44. A network server, as recited in claim 38, wherein the tape unit is selected from the group consisting of an IDE tape unit, an enhanced IDE tape unit, an ATA tape unit, an ESDI tape unit, and a SCSI tape unit.

45. A network server, as recited in claim 39, wherein the CD-ROM is selected from the group consisting of an IDE CD-ROM, an enhanced IDE CD-ROM, an ATA CD-ROM, an ESDI CD-ROM, and a SCSI CD-ROM.

46. A network server, as recited in claim 35, wherein the LAN adapter is selected from the group consisting of a baseband network LAN adapter, a broadband network LAN adapter, a token passing network LAN adapter, a token ring network LAN adapter, a 10base-T network LAN adapter, and an Ethernet LAN adapter.

47. A network server, as recited in claim 35, wherein the local bus comprises a VL bus.

48. A network server, as recited in claim 35, wherein the local bus comprises a PCI bus.

49. A network server, as recited in claim 35, wherein the input/output bus is selected from the group consisting of an ISA bus, an EISA bus, a Micro Channel Architecture Bus, and a local bus.

50. A network server, as recited in claim 35, further comprising:

a communications device coupled to one of the local bus and the input/output bus.

51. A network server, as recited in claim 50, wherein the communications device comprises one of a modem, a faxmodem, and an integrated telephony device.

52. A network server, as recited in claim 51, wherein the communications device further comprises a printed circuit card coupled to one of the local bus and the input/output bus via a modular connector.

53. A network server, as recited in claim 51, wherein the communications device is coupled to one of the local bus and the input/output bus via a serial interface.

54. A network server, as recited in claim 35, further comprising:

an input/output device coupled to one of the local bus and the input/output bus.

55. A network server, as recited in claim 54, wherein the input/output device is selected from the group consisting of a text display adapter, a graphics adapter, a 3-D graphics adapter, a SVGA display adapter, an XGA adapter, a display adapter supporting VESA graphics standards, a CGA adapter, an adapter supporting Hercules graphics standards.

56. A network server, as recited in claim 54, wherein the input/output device is selected from the group consisting of a pointing device, a mouse, a trackball, and a keyboard.

57. A network server computer system incorporating a processor providing out-of-order load store execution control, the network server computer system comprising:
  a local area network (LAN) adapter; and
  a superscalar processor coupled to the LAN adapter for processing data provided to and received from the LAN adapter, the superscalar processor including a load unit, a store unit, and a load/store execution controller for allowing load and store instructions to execute generally out-of-order with respect to each other while enforcing data dependencies between the load and store instructions, the load/store execution controller of the processor comprising:
    an age ordered array of scheduler operation entries, each scheduler operation entry indicative of a corresponding operation in an operation sequence;
    load hold logic coupled to the load unit to selectively inhibit execution of a load operation in the load unit upon receipt of a store older indication; and
    scan chain logic coupled to the operation entries and to the load hold logic, the scan chain logic supplying store older indications indicating the presence of an older store operation relative to a load operation in the load unit.

58. A network server, as recited in claim 57, wherein the LAN adapter is selected from the group consisting of a baseband network LAN adapter, a broadband network LAN adapter, a token passing network LAN adapter, a token ring network LAN adapter, a 10base-T network LAN adapter, and an Ethernet LAN adapter.

59. A network server, as recited in claim 57, further comprising a hard disk coupled to the superscalar processor.

60. A network server, as recited in claim 59, wherein the hard disk is selected from the group consisting of an IDE disk, an enhanced IDE disk, an ATA disk, an ESDI disk, and a SCSI disk.

61. A network server, as recited in claim 57, further comprising a tape unit coupled to the superscalar processor.

62. A network server, as recited in claim 61, wherein the tape unit is selected from the group consisting of an IDE tape unit, an enhanced IDE tape unit, an ATA tape unit, an ESDI tape unit, and a SCSI tape unit.

63. A network server, as recited in claim 57, flrther comprising a CD-ROM coupled to the superscalar processor.

64. A network server, as recited in claim 63, wherein the CD-ROM is selected from the group consisting of an IDE CD-ROM, an enhanced IDE CD-ROM, an ATA CD-ROM, an ESDI CD-ROM, and a SCSI CD-ROM.

65. A network server, as recited in claim 57, further comprising a jukebox coupled to the superscalar processor.

66. A network server, as recited in claim 57, further comprising a RAID coupled to the superscalar processor.

67. A network server, as recited in claim 57, further comprising a flash memory coupled to the superscalar processor.

68. A network server, as recited in claim 57, further comprising a modem coupled to the superscalar processor.

69. A network server, as recited in claim 57, further comprising a faxmodem coupled to the superscalar processor.

70. A network server, as recited in claim 57, further comprising an integrated telephony device coupled to the superscalar processor.

71. A network server, as recited in claim 57, further comprising a display adapter coupled to the superscalar processor, the display adapter selected from the group consisting of a text display adapter, a graphics adapter, a 3-D graphics adapter, a SVGA display adapter, an XGA adapter, a display adapter supporting VESA graphics standards, a CGA adapter, an adapter supporting Hercules graphics standards.

72. A network server, as recited in claim 57, further comprising an input/output device coupled to the superscalar processor, the input/output device selected from the group consisting of a pointing device, a mouse, a trackball, and a keyboard.

73. A multimedia computer system incorporating a processor providing out-of-order load store execution control, the multimedia computer system comprising:
  a multimedia performance device;
  a multimedia adapter coupled to the multimedia performance device and coupled to the multimedia signal acquisition device, the multimedia adapter including a signal conversion interface for synthesizing and sampling multimedia signals;
  an input/output bus coupled to the multimedia adapter for communicating transfers of multimedia data; and
  a superscalar processor coupled to the input/output bus for processing multimedia data and controlling communication of multimedia data between the superscalar processor and the multimedia adapter, the superscalar processor including a load unit, a store unit, and a load/store execution controller for allowing load and store instructions to execute generally out-of-order with respect to each other while enforcing data dependencies between the load and store instructions, the load/store execution controller of the processor comprising:
    an age ordered array of scheduler operation entries, each scheduler operation entry indicative of a corresponding operation in an operation sequence;
    load hold logic coupled to the load unit to selectively inhibit execution of a load operation in the load unit upon receipt of a store older indication; and
    scan chain logic coupled to the operation entries and to the load hold logic, the scan chain logic supplying store older indications indicating the presence of an older store operation relative to a load operation in the load unit.

74. A multimedia computer system according to claim 73 further comprising:
  a multimedia signal acquisition device.

75. A multimedia computer system according to claim 74 wherein:
  the multimedia performance device includes a motion video display selected from the group of televisions, high-definition televisions and high resolution computer monitors;
  the multimedia signal acquisition device includes a video camera; and
  the multimedia adapter includes a motion video adapter.

76. A multimedia computer system according to claim 75 wherein:

the multimedia performance device includes a video frame buffer.

77. A multimedia computer system according to claim 75 wherein:

the multimedia adapter performance device includes a system for video encoding and decoding in accordance with Moving Pictures Expert Group (MPEG) standards.

78. A multimedia computer system according to claim 73 wherein:

the multimedia performance device includes a video frame buffer and a graphics display selected from the group of televisions, high-definition televisions and high resolution computer monitors; and the multimedia adapter includes a graphics adapter selected from the group of SVGA, XGA, VESA, CGA and Hercules graphic standard adapters.

79. A multimedia computer system according to claim 73 wherein:

the multimedia performance device includes an audio performance device selected from among the group of mixing consoles, signal processing devices, synthesizers, MIDI sequencers, power amplifiers and speakers; and the multimedia adapter includes an audio adapter selected from among the group of D/A interfaces and A/D interfaces.

80. A multimedia computer system according to claim 79 further comprising:

a multimedia signal acquisition device including an audio signal acquisition device selected from among the group including microphones, signal processing devices and digital samplers.

81. A multimedia computer system according to claim 73 further comprising:

an SCSI adapter coupled to the input/output bus; and a read/write storage media coupled to the SCSI adapter for storing and accessing data including multimedia data.

82. A multimedia computer system according to claim 81 wherein the read/write storage media include media selected from among the group of magnetic disk drives, magnetic tape drives and CD-ROM drives.

83. A multimedia computer system according to claim 73 further comprising:

a local area network (LAN) adapter coupled to the input/output bus.

* * * * *

UNITED STATES PATENT AND TRADEMARK OFFICE
CERTIFICATE OF CORRECTION

PATENT NO. : 5,754,812
DATED : May 19, 1998
INVENTOR(S) : John G. Favor, et al.

It is certified that error appears in the above-identified patent and that said Letters Patent is hereby corrected as shown below:

On the title page, insert the following:

-- Related U.S. Application Data

[60] Provisional application No.60/005,069, Oct. 6, 1995.
Provisional application No. 60/005,021, Oct. 10, 1995. --.

Column 1, line 3; please insert --This Application claims benefit of U.S. Provisional Application No. 60/005,069, filed October 6, 1995 and U.S. Provisional Application No. 60/005,021, filed October 10, 1995.--,
Column 6, lines 55 and 56; please delete "and filed on even date herewith",
Column 8, line 67 ; please delete "the these" and insert --these--,
Column 10, line 5; please delete ""progresses"" and insert --progresses--,
Column 19, line 31; please delete "follows," and insert --follows--, *and*
Column 29, line 50; please delete "co-pending".

Signed and Sealed this

Twenty-first Day of September, 1999

*Attest:*

Q. TODD DICKINSON

*Attesting Officer*     *Acting Commissioner of Patents and Trademarks*